(12) United States Patent
Kopikare et al.

(10) Patent No.: US 10,521,503 B2
(45) Date of Patent: Dec. 31, 2019

(54) AUTHENTICATING A RESPONDENT TO AN ELECTRONIC SURVEY

(71) Applicant: QUALTRICS, LLC, Provo, UT (US)

(72) Inventors: Milind Kopikare, Draper, UT (US); Larry Dean Cheesman, Provo, UT (US); Daryl R Pinkal, American Fork, UT (US); Cameron James Holiman, Orem, UT (US)

(73) Assignee: Qualtrics, LLC, Provo, UT (US)

( * ) Notice: Subject to any disclaimer, the term of this patent is extended or adjusted under 35 U.S.C. 154(b) by 0 days.

(21) Appl. No.: 15/274,786

(22) Filed: Sep. 23, 2016

(65) Prior Publication Data

US 2018/0089412 A1    Mar. 29, 2018

(51) Int. Cl.
| | |
|---|---|
| *G06F 17/20* | (2006.01) |
| *G06F 17/24* | (2006.01) |
| *G06F 21/36* | (2013.01) |
| *G06F 21/32* | (2013.01) |
| *G06K 9/00* | (2006.01) |

(52) U.S. Cl.
CPC .......... *G06F 17/248* (2013.01); *G06F 17/242* (2013.01); *G06F 17/243* (2013.01); *G06F 21/32* (2013.01); *G06F 21/36* (2013.01); *G06K 9/00006* (2013.01); *G06K 9/00161* (2013.01); *G06K 9/00228* (2013.01); *G06K 9/00281* (2013.01); *G06K 9/00288* (2013.01); *G06K 9/00892* (2013.01)

(58) Field of Classification Search
CPC ...... G06F 21/44; G06F 3/0482; G06F 17/243; G06F 21/36
See application file for complete search history.

(56) References Cited

U.S. PATENT DOCUMENTS 6,189,029 B1  2/2001 Fuerst
7,103,835 B1*  9/2006 Yankovich ............ G06F 17/243
  715/234

(Continued)

OTHER PUBLICATIONS

Html5rocks.com, "Synchronized Cross-device Mobile Testing", Jan 4, 2014, pp. 1-25 https://www.html5rocks.com/en/tutorials/tooling/synchronized-cross-device-testing/.

(Continued)

*Primary Examiner* — Shahid K Khan
(74) *Attorney, Agent, or Firm* — Keller Jolley Preece

(57) ABSTRACT

This disclosure generally covers systems and methods that, in some embodiments, provide an electronic survey template for creating a user customizable electronic survey including authentication features. Those authentication features include, in some embodiments, authenticating questions with elements that capture a digitally drawn signature, digital image, fingerprint, or voiceprint. Certain embodiments of the disclosed systems and methods provide a graphical user interface comprising an electronic survey template with a menu of survey question types, including an option to create authenticating questions within the electronic survey template. Some embodiments of the disclosed systems and methods also provide functions and features that allow users to preview a customized electronic survey template as an interactive electronic survey or to preview individual electronic survey questions as interactive electronic survey questions.

20 Claims, 15 Drawing Sheets

(56) References Cited

U.S. PATENT DOCUMENTS

| | | | |
|---|---|---|---|
| 7,698,339 B2 | 4/2010 | Zhang et al. | |
| 7,991,916 B2 | 8/2011 | Meek et al. | |
| 8,051,145 B2 | 11/2011 | Wu et al. | |
| 8,229,915 B1 | 7/2012 | Lloyd et al. | |
| 8,239,755 B2 | 8/2012 | Maguire | |
| 8,745,075 B2 | 6/2014 | Gaucas et al. | |
| 8,868,570 B1 | 10/2014 | Skut et al. | |
| 8,996,985 B1 | 3/2015 | Johnston et al. | |
| 9,069,768 B1 | 6/2015 | Sampson | |
| 9,119,156 B2 | 8/2015 | Green et al. | |
| 9,524,277 B2 | 12/2016 | Nekkalapudi | |
| 9,584,629 B2 | 2/2017 | Lerman | |
| 2002/0138528 A1 | 9/2002 | Gong et al. | |
| 2003/0023953 A1 | 1/2003 | Lucassen et al. | |
| 2003/0056100 A1* | 3/2003 | Beatson | G07C 9/00063 713/176 |
| 2003/0101235 A1 | 5/2003 | Zhang | |
| 2003/0222910 A1 | 12/2003 | Guerrero | |
| 2006/0122889 A1 | 6/2006 | Burdick et al. | |
| 2006/0282415 A1 | 12/2006 | Shibata et al. | |
| 2007/0208703 A1 | 9/2007 | Shi et al. | |
| 2007/0260475 A1* | 11/2007 | Bhanote | G06Q 30/02 705/1.1 |
| 2007/0296805 A1 | 12/2007 | Tedenvall et al. | |
| 2008/0109715 A1* | 5/2008 | Stover | G06F 17/2247 715/237 |
| 2009/0138798 A1 | 5/2009 | Fan et al. | |
| 2009/0187593 A1 | 7/2009 | Chen et al. | |
| 2009/0215478 A1 | 8/2009 | Leinonen et al. | |
| 2009/0249216 A1 | 10/2009 | Charka et al. | |
| 2010/0017704 A1 | 1/2010 | Jaffe et al. | |
| 2010/0161378 A1 | 6/2010 | Josifovski et al. | |
| 2010/0180192 A1 | 7/2010 | Hall | |
| 2010/0226564 A1 | 9/2010 | Marchesotti et al. | |
| 2010/0293598 A1 | 11/2010 | Collart et al. | |
| 2011/0054960 A1 | 3/2011 | Bhatia et al. | |
| 2011/0173589 A1 | 7/2011 | Guttman et al. | |
| 2011/0231226 A1 | 9/2011 | Golden | |
| 2012/0042102 A1 | 2/2012 | Chung et al. | |
| 2012/0203861 A1 | 8/2012 | Flack et al. | |
| 2012/0311140 A1 | 12/2012 | Hashimoto et al. | |
| 2013/0014153 A1 | 1/2013 | Bhatia et al. | |
| 2013/0132817 A1 | 5/2013 | Sharad et al. | |
| 2013/0174012 A1 | 7/2013 | Kwan et al. | |
| 2013/0187926 A1 | 7/2013 | Silverstein et al. | |
| 2013/0326333 A1 | 12/2013 | Hashmi | |
| 2013/0326337 A1 | 12/2013 | Lehmann et al. | |
| 2013/0326406 A1 | 12/2013 | Reiley et al. | |
| 2014/0012676 A1 | 1/2014 | Forte | |
| 2014/0079297 A1 | 3/2014 | Tadayon et al. | |
| 2014/0214535 A1 | 7/2014 | Kee et al. | |
| 2014/0351268 A1 | 11/2014 | Weskamp et al. | |
| 2015/0012812 A1* | 1/2015 | Wu | G06F 17/2247 715/234 |
| 2015/0033310 A1* | 1/2015 | Chen | H04L 9/3231 726/7 |
| 2015/0035959 A1 | 2/2015 | Amble et al. | |
| 2015/0154660 A1 | 6/2015 | Weald et al. | |
| 2015/0193794 A1 | 7/2015 | Douglas et al. | |
| 2015/0248676 A1* | 9/2015 | Vaidyanathan | G06Q 20/322 705/44 |
| 2015/0334121 A1* | 11/2015 | Hernberg | H04L 63/0428 713/171 |
| 2016/0044071 A1 | 2/2016 | Sandholm | |
| 2016/0103800 A1 | 4/2016 | Girault et al. | |
| 2016/0212178 A1 | 7/2016 | Zhang et al. | |
| 2016/0266881 A1* | 9/2016 | Thompson | G06F 8/60 |
| 2016/0364201 A1 | 12/2016 | Beveridge et al. | |
| 2017/0060812 A1 | 3/2017 | Williams et al. | |
| 2018/0122256 A1 | 5/2018 | Smith et al. | |
| 2018/0341626 A1 | 11/2018 | Williams et al. | |
| 2019/0139282 A1 | 5/2019 | Rathore et al. | |

OTHER PUBLICATIONS

Smashingmagazine.com, "Review of Cross-Browser Testing Tools" published Aug 7, 2011 and as available on Jul. 27, 2015, pp. 1-13 http://www.smashingmagazine.com:80/2011/08/a-dozen-cross-browser-testing-tools/.

U.S. Appl. No. 14/841,357, filed Jun. 23, 2017, Office Action.

Emmet LiveStyle: installation and usage, Jul. 25, 2013, pp. 1-3, https://github.com/sergeche/livestyle/blob/master/INSTALLATION.md.

Surveygizmo.com how to create accessible online form, Nov. 13, 2013, pp. 1-10, https://www.surveygizmo.com/survey-blog/creating-accessible-online-forms-everyone-benefits-from-a-well-designed-web-form/.

U.S. Appl. No. 14/841,357, filed Dec. 1, 2017, Office Action.

U.S. Appl. No. 14/841,357, filed Apr. 12, 2018, Notice of Allowance.

U.S. Appl. No. 15/339,169, filed Jun. 4, 2018, Office Action.

U.S. Appl. No. 16/050,908, filed Oct. 19, 2018, Office Action.

Survey Monkey online survey generator, 1999 as evidenced by youtube video available online at https://www.youtube.com/watch?v=OLK5a4y0Lmo, published Dec. 12, 2015).

U.S. Appl. No. 15/339,169, filed Feb. 15, 2019, Office Action.

U.S. Appl. No. 16/050,908, filed Feb. 4, 2019, Office Action.

U.S. Appl. No. 16/050,908, dated May 23, 2019, Notice of Allowance.

U.S. Appl. No. 15/339,169, dated Oct. 18, 2019, Office Action.

* cited by examiner

AUTHENTICATING A RESPONDENT TO AN ELECTRONIC SURVEY

BACKGROUND

Firms, researchers, and other organizations increasingly use electronic surveys to gather data concerning target populations or to obtain feedback from customers. With increased access to the Internet, the rise of mobile phones, and the growing popularity of social media, these organizations have greater ability to distribute electronic surveys to potential respondents. Those potential respondents in turn have greater access to respond to electronic surveys. At the same time, firms increasingly provide users with software applications and other tools to create electronic surveys that can be distributed through a variety of platforms over computer networks.

Along with the increased popularity of electronic surveys have come some drawbacks to the ease and facility that electronic surveys offer. In contrast to in-person surveys, for example, some conventional electronic survey systems contain weaknesses that potential respondents can exploit to misrepresent the identity of the respondent. For instance, the digital aspect of electronic surveys and the ease with which answers can be electronically transmitted poses an authentication problem unique to electronic survey systems and the computer devices through which respondents provide answers (e.g., mobile devices or personal computers).

Indeed, in some contexts, accurately identifying and authenticating the identity of a survey respondent may be critical to the survey administrator. For example, a hospital who seeks feedback or other data from current or former patients may find it important to ensure that a survey respondent has actually visited or received treatment from the hospital. A pharmaceutical company may likewise find it important to authenticate the identity of a survey respondent when the responses to an electronic survey will be submitted to a government agency as part of an application for approval to distribute or market a drug. As another example, a marketing firm may find it critical to authenticate that survey respondents are within a certain demographic or have previously purchased certain products when using an electronic survey to gather information about an audience's response to certain products or an advertising campaign. Accordingly, organizations often find it critical to accurately authenticate the identity of a survey respondent when spending significant amounts of money on health treatments, government agency review, or advertising campaigns that can often depend on the results of an electronic survey.

Despite the importance to some organizations of authenticating the identity of a respondent to an electronic survey, conventional electronic survey systems often lack features that allow a survey administrator to collect accurate data concerning a survey respondent's identity or mechanisms to authenticate the collected data. Moreover, conventional electronic survey systems typically lack mechanisms for the survey administrator to authenticate biographical data associated with a particular survey respondent. Consequently, computers with software applications or artificial intelligence capabilities can sometimes respond to an electronic survey by exploiting the ineffective authentication mechanisms of conventional electronic surveys. With ineffective authentication mechanisms, conventional electronic survey systems can produce unreliable or otherwise erroneous survey response data.

Additionally, conventional methods of authenticating the identity of a user on a computer network are often unsuitable for electronic surveys. For example, some authentication methods allow an administrator to authenticate the identity of a potential user by sending a hyperlink embedded within an email to a user. Other authentication methods allow a potential user to log into a website by using profile credentials from a social media account. Yet other authentication methods provide a potential user with unique login credentials. These conventional authentication methods are often unsuitable for electronic surveys because they intrude on the potential user's email or social media accounts, introduce additional security concerns by exposing login credentials for personal accounts, or add insufficient measures of identifying the identity of a potential survey respondent. Given these deficiencies, conventional authentication methods may decrease response rates or introduce fraudulent or inaccurate responses into the results of an electronic survey.

Accordingly, these and other disadvantages decrease the utility and security of conventional systems and methods for providing electronic surveys.

SUMMARY

This disclosure describes solutions to some or all of the foregoing problems with various embodiments of systems and methods for creating and distributing a customizable electronic survey. In particular, in some embodiments, the systems and methods enable the creation and distribution of electronic surveys that collect and authenticate information concerning a survey respondent (e.g., a respondent identity). For instance, some embodiments of the disclosed systems and methods provide a template for a survey administrator to create an electronic survey that authenticates information concerning a survey respondent in a less intrusive manner than conventional systems or methods. To do so, some embodiments of the systems and methods create authenticating questions that can accurately collect survey responses from authenticated survey respondents while preserving (or minimally affecting) response rates for an electronic survey.

Certain embodiments of the disclosed systems and methods enable a survey administrator to create a customizable authenticating question to include within an electronic survey. For example, in some embodiments, the systems and methods provide options and features for a survey administrator to compose or otherwise create customizable survey questions. As part of customizing an electronic survey, the systems and methods provide tools for a survey administrator to define a particular survey question as an authenticating question type (e.g., as opposed to a standard question type). Upon receiving that definition from the survey administrator, some embodiments of the system and method create an electronic survey question (within an electronic survey) that authenticates information concerning a survey respondent— similar to the process of creating other types of electronic survey questions.

As part of the process of creating an authenticating question to include within an electronic survey, certain embodiments of the systems and methods allow the administrator to customize the authentication method. For example, in one or more embodiments, the systems and methods provide a survey administrator with a variety of different authentication parameters or settings to include in an authenticating question. Upon selecting a particular authentication parameter or setting, for example, the systems and methods automatically associate specific question components with the authenticating question to enable a survey respondent to respond with authenticatable information. Accordingly, the disclosed systems and methods provide authenticating questions that inhibit imposters, software applications, or computers utilizing artificial intelligence from fraudulently responding to an electronic survey.

For instance, certain embodiments of the disclosed methods or systems provide a survey administrator with an option to collect a survey respondent's signature (or another type of authentication information) to assist in authenticating the survey respondent's identity. In such embodiments, the systems and methods provide a signature field within a signature question that—when presented to a respondent device—allows the survey respondent to input his signature in response to the signature question (e.g., via a touch screen). Additionally, in one or more embodiments, the systems and methods provide a survey administrator with options to analyze signature data received in response to a signature question to authenticate a survey respondent's identity. In other words, the systems and methods create an electronic survey question that collects, stores, and/or analyzes data representing authentication information for a respondent of an electronic survey.

The following description sets forth additional features and advantages of the present invention. Some of these additional features and advantages will be obvious from the description or may be learned by the practice of such embodiments. A person of ordinary skill in the art may realize and obtain the features and advantages of these embodiments through the systems and methods particularly pointed out in the appended claims.

BRIEF DESCRIPTION OF THE DRAWINGS

Below is a brief description of the figures this disclosure references.

DETAILED DESCRIPTION

Figure 1:
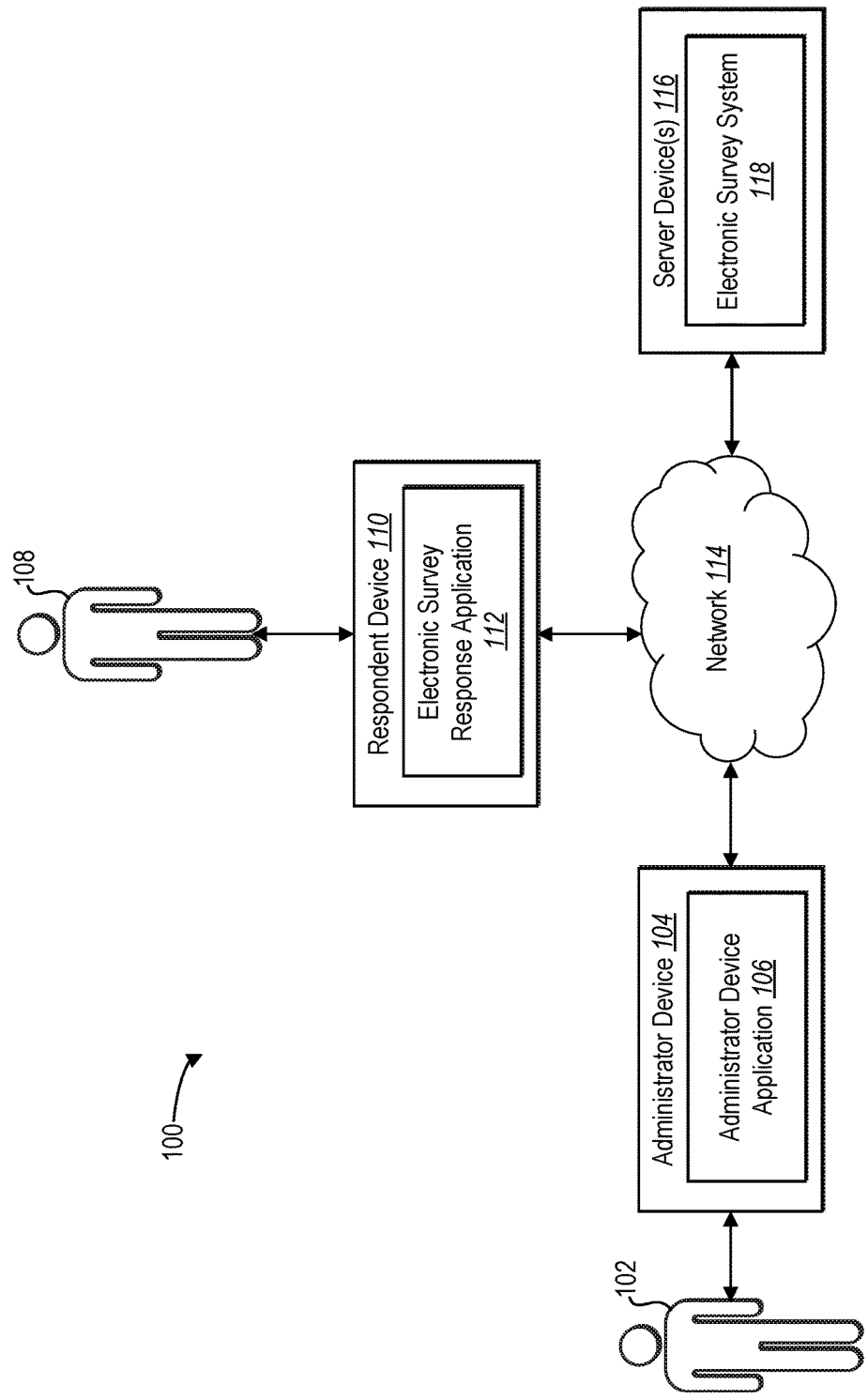
FIG. 1 illustrates a block diagram of an environment for implementing a communication system in accordance with one or more embodiments.

This disclosure describes one or more embodiments of an electronic survey system that create electronic surveys, including an electronic survey question to collect authenticating information. For example, in some embodiments, the electronic survey system provides an electronic survey template for creating an authenticating question to include as a question in an electronic survey. In some embodiments, the authenticating question includes one or more components that request and collect authenticating information associated with the respondent. In addition, in one or more embodiments, the electronic survey system provides a survey administrator with tools for the authenticating question that analyze the collected authenticating information to authenticate the respondent (e.g., verify a respondent's identity). As explained below, various embodiments of the electronic survey system provide an intuitive, efficient, and unobtrusive process of authenticating various types of authenticating information associated with a respondent of an electronic survey.

In some embodiments, the electronic survey system enables a survey administrator to create an electronic survey that includes respondent authentication features. For example, in certain embodiments, the electronic survey system provides an electronic survey template (to an administrator device associated with the survey administrator) that enables the survey administrator to create an authenticating question. The electronic survey template includes options for the survey administrator to define a type of electronic survey question from multiple survey question types, including an option to define the electronic survey question as an authenticating question.

Based on the survey administrator selecting the option for an authenticating question, the electronic survey system provides authentication features using the same or similar process flow used for creating other electronic survey questions, such as standard survey questions. In some embodiments of the electronic survey system, the system automatically provides authentication features when a survey administrator defines a question as a particular type of authenticating question, such as creating a signature field in which a respondent may provide an electronic signature. The electronic survey system thus provides an efficient and intuitive way to incorporate potentially complex authentication processes within an electronic survey.

To create an electronic survey question, certain embodiments of the electronic survey system automatically incorporate various components (e.g., computer implemented instructions to request, collect, store, transmit, and/or analyze authentication information) into an authenticating question based on receiving an indication of a survey administrator's selection corresponding to an authenticating question type. For instance, based on a survey administrator selecting an option to define an electronic survey question as a signature question type, the system inserts a signature field into the electronic survey template and associates components with the signature question that enable a respondent to interact with the signature field. In particular, and with respect to a signature question, components can include instructions to detect a respondent's touch gestures on a touch screen to compose an electronic signature and/or analyze whether the electronic signature is authentic. As another example, components in some embodiments of the electronic survey system instruct the system to validate whether the signature field contains an electronic signature and—if so—instruct the system to proceed to a next electronic survey question.

In some of the embodiments that analyze whether an electronic signature is authentic, the electronic survey system associates components with the signature question that apply traditional signature and handwriting analysis techniques, such as measuring spacing, gestures, and widths of a signature. In other embodiments, where the electronic survey system electronically captures a signature, the electronic survey system associates components with the signature question that apply other signature or handwriting analysis techniques, such as tracking the speed or rhythm of the signature or tracking the order of gestures that form a signature.

In one embodiment, the electronic survey system provides to an administrator device an electronic survey template for creating a user customizable electronic survey question and a selectable signature option to insert a signature field into the electronic survey template. The system further receives an indication of a selection corresponding to the selectable signature option from the administrator device. Based on receiving that indication, the system inserts the signature field into the electronic survey template to create an electronic survey question comprising the signature field.

Certain embodiments of the electronic survey system provide one or more options to create electronic survey questions that authenticate biometric data inputs from a survey respondent. For example, the system provides options to insert one or more electronic survey questions that capture an image, a fingerprint, a voiceprint, retina scan, or eye scan from a survey respondent (e.g., by receiving a digital file of data—uploaded by a survey respondent or captured by a respondent device—that represents an image, fingerprint, voiceprint, retina scan, or eye scan). These and other options for collecting biometric data provide a survey administrator the ability to authenticate and record evidence of a respondent's identity.

To provide more control over who may respond to certain electronic survey questions, the electronic survey system provides, in some embodiments, options to apply logic display rules that control which electronic survey question the system presents to a survey respondent. For example, some embodiments of the electronic survey system provide question display logic rules that can instruct the system to identify a next electronic survey question based on whether a survey respondent provides valid identification data.

In addition, many organizations want to test the functionality of an electronic survey before administering the survey. Accordingly, some embodiments of the electronic survey system provide preview options of an electronic survey designed by a survey administrator. In some instances, the system provides an option to preview an interactive electronic survey (within a graphical user interface) and respond to each electronic survey question. In other instances, the system provides an option to preview and respond to authenticating questions, for example, by digitally drawing an electronic signature within a signature field or capturing an image with an image collection element while within a preview of the interactive electronic survey. The interactive aspects of these previews permit a survey administrator to test the electronic survey as whole and/or test an electronic survey question separately.

This disclosure uses several terms with the following definitions. The term "electronic survey" refers to an electronic communication used to collect information. For example, an electronic survey may include an electronic communication in the form of a poll, questionnaire, census, or other type of sampling. In some example embodiments, the term "electronic survey" may also refer to a method of requesting and collecting information from respondents via an electronic communication such as, for example, a text message, an instant message, an alert within an application, a message within a social media network, a webpage, and/or an email. In some example embodiments, the term "electronic survey" may also refer to an electronic document that includes a single electronic communication used to collect information (e.g., an electronic signature block). As used herein, the term "respondent" refers to a person who participates in, and responds to, an electronic survey.

The term "electronic survey question" refers to a prompt within an electronic survey that invokes a response from a respondent. Example types of electronic survey questions include, but are not limited to, multiple choice, open-ended, ranking, scoring, summation, demographic, dichotomous, differential, cumulative, dropdown, matrix, net promoter score (NPS), single textbox, heat map, and any other type of prompt that can invoke a response from a respondent. An electronic survey question can refer to a request portion and/or response portion. For example, when describing a multiple choice survey question, the term electronic survey question may refer to one or both of the question portion and/or the multiple choice answers associated with the multiple-choice question. An electronic survey question may be in any format and need not include a question mark. For example, an electronic survey question may comprise of a command to draw a digital signature, take an image, or enter the sum of multiple variables. In addition, the term "authenticating question" refers to a type of electronic survey question that includes a prompt for a survey respondent to provide user input that may be used to authenticate information (e.g., a signature, an image, biographic or demographic information) about the survey respondent (e.g., the respondent's identity).

The term "electronic survey template" refers to an electronic space (e.g., a document or file) in which a user composes, formats, edits, and/or otherwise creates one or more electronic survey questions. In some embodiments, the electronic survey template can be represented in a graphical user interface as a graphical space (e.g., a question block) in which a user creates an electronic survey question by selecting options, inputting data (e.g., text), and associating rules and/or other features with an electronic survey question. In other embodiments, an electronic survey template comprises multiple graphical spaces (e.g., question blocks) in which a user creates a corresponding multiple of electronic survey questions (e.g., each graphical space represents a separate electronic survey question).

Turning now to the figures, FIG. 1 illustrates a block diagram of an embodiment of a communication system 100 (or simply "system 100"). In general, and as illustrated in FIG. 1, the system 100 includes an administrator device 104, including an administrator device application 106. As shown in FIG. 1, the administrator device 104 is associated with a survey administrator 102. The system 100 further includes a respondent device 110, including an electronic survey response application 112. The respondent device 110 is associated with a survey respondent 108. Although FIG. 1 illustrates one respondent device 110 and one survey respondent 108, the communication system 100 may include any number of respondent devices and any number of associated survey respondents.

The administrator device 104 and the respondent device 110 can communicate with server device(s) 116, including an electronic survey system 118, over a network 114. As described below, the server device(s) 116 can enable the various functions, features, processes, methods, and systems described herein using, for example, the electronic survey system 118. Additionally, or alternatively, the server device(s) 116 coordinate with the administrator device 104 and/or the respondent device 110 to perform or provide the various functions, features, processes, methods, and systems described in more detail below. Moreover, although FIG. 1 illustrates a particular arrangement of the administrator device 104, the server device(s) 116, the respondent device 110, and the network 114, various additional arrangements are possible. For example, the server device(s) 116 and the electronic survey system 118 may directly communicate with the administrator device 104, bypassing the network 114.

Generally, the administrator device 104 and respondent device 110 can include any one of various types of client devices. For example, the administrator device 104 and respondent device 110 can be a mobile device (e.g., a smart phone), tablet, laptop computer, desktop computer, or any other type of computing device as further explained below with reference to FIG. 8. Additionally, the server device(s) 116 can include one or more computing devices including those explained below with reference to FIG. 8. The administrator device 104, respondent device 110, server device(s) 116, and network 114 may communicate using any communication platforms and technologies suitable for transporting data and/or communication signals, including any known communication technologies, devices, media, and protocols supportive of data communications, examples of which are described with reference to FIG. 9.

As an initial overview of one or more embodiments of the system 100, the server device(s) 116 provide the administrator device 104 access to the electronic survey system 118 by way of the network 114. In one or more embodiments, accessing the electronic survey system 118, the server device(s) 116 provide one or more electronic documents to the administrator device 104 to allow the survey administrator 102 to compose an electronic survey. For example, the electronic survey system 118 can include a website (e.g., one or more webpages) that allows a survey administrator 102 to create an electronic survey for distribution using the electronic survey system 118.

In particular, the administrator device 104 may launch the administrator device application 106 to facilitate interacting with the electronic survey system 118. In some embodiments, the administrator device application 106 comprises a web browser, an applet, or other software application available to the administrator device 104. The administrator device application 106 may coordinate communications between the administrator device 104 and the server device(s) 116 that ultimately result in the creation of an electronic survey that the electronic survey system 118 distributes to one or more respondent devices. For instance, to facilitate the creation of an electronic survey, the administrator device application 106 can present a graphical user interface of the electronic survey system 118, detect interactions from the survey administrator 102 with the graphical user interface, and communicate user input based on the detected interactions to the electronic survey system 118.

After the survey administrator 102 has finished composing an electronic survey, in some embodiments, the electronic survey system 118 causes the server device(s) 116 to communicate the electronic survey to the respondent device 110. For example, the electronic survey system 118 can provide a first question of an electronic survey to the respondent device 110, or alternatively, the electronic survey system can provide multiple questions of an electronic survey at the same time. Upon receiving the electronic survey, the electronic survey response application 112 causes the respondent device to present the electronic survey to the survey respondent 108. The survey respondent 108 may respond to electronic survey questions by providing user input to the electronic survey response application 112 (e.g., by selecting an answer using a touch screen or a mouse or by inputting text data using a keyboard). In some embodiments, the electronic survey response application 112 comprises a web browser, an applet, a dedicated application (e.g., a dedicated electronic survey application), an instant message application, an SMS application, an email application, or other software application available to the respondent device 110.

After the survey respondent 108 responds to an electronic survey question (within an electronic survey) using the electronic survey response application 112, the electronic survey response application 112 instructs the respondent device 110 to send data representing the response to the server device(s) 116. The server device(s) 116 receive data representing the response and make that data accessible to the electronic survey system 118. In some embodiments, the data representing the response includes information that the electronic survey system 118 uses to authenticate the identity (or some other characteristic) of the survey respondent 108.

This disclosure will provide additional details concerning the electronic survey system 118 by referencing FIGS. 2A-4D. Generally, FIGS. 2A-4D show examples of the administrator device 104 presenting graphical user interfaces 204, 300, and 400, respectively, via a display screen 202 of the administrator device 104. Although this disclosure describes the administrator device 104 presenting data received from the electronic survey system 118 on a graphical user interface in connection with FIGS. 2A-4D, a person having ordinary skill in the art would understand that any component of system 100 (described above with reference to FIG. 1) can perform the functions and features of the electronic survey system 118.

Figure 2A:
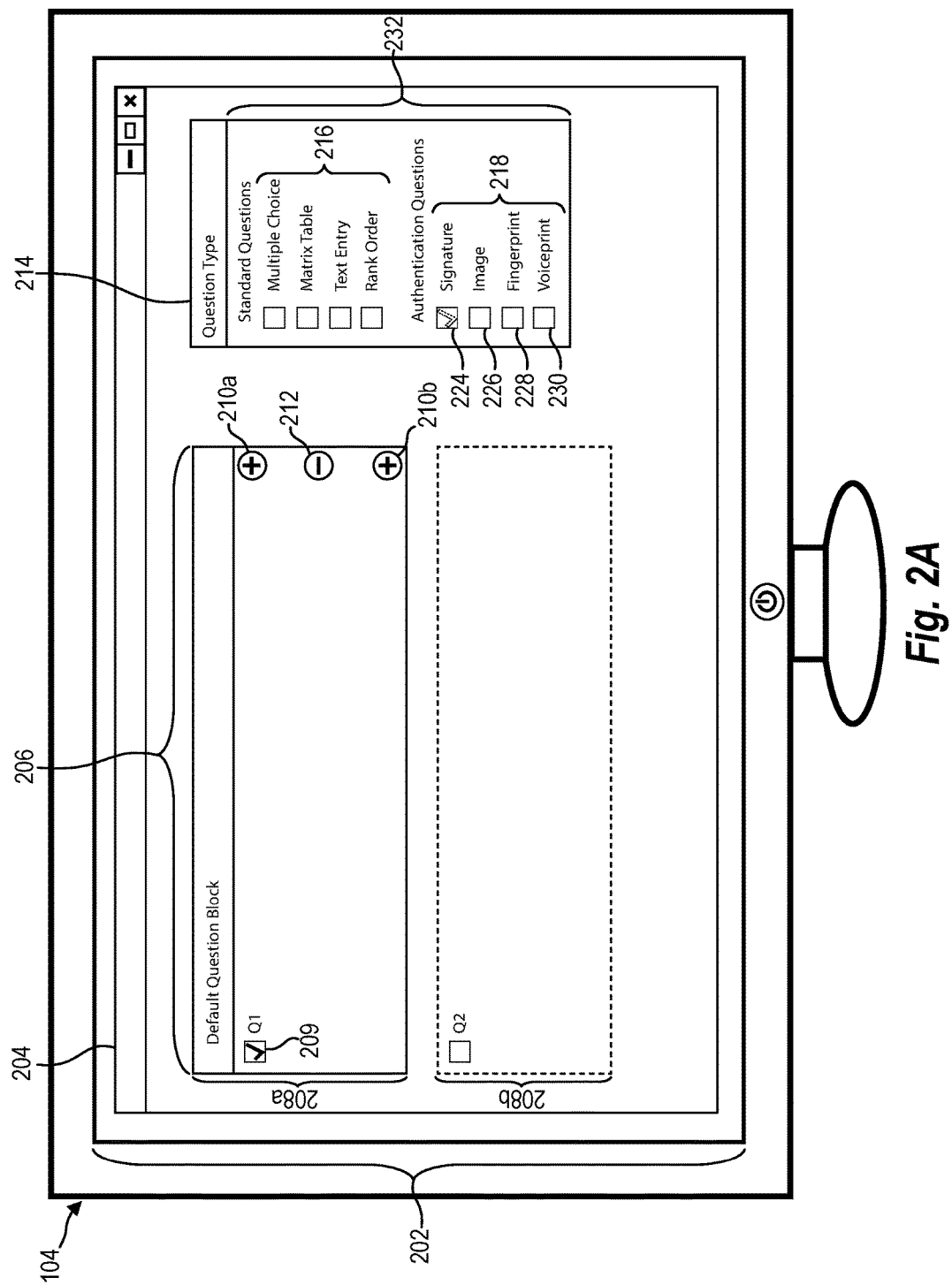
FIGS. 2A-2C illustrate a graphical user interface showing a plurality of views of an electronic survey template in accordance with one or more embodiments.

FIG. 2A illustrates an embodiment of the graphical user interface 204 that the electronic survey system 118 provides to the administrator device 104 to allow the survey administrator 102 to compose an electronic survey. As shown in FIG. 2A, the graphical user interface 204 includes an electronic survey template 206. As described above, an electronic survey template refers to an electronic space, such as a graphical space within a graphical user interface, in which a survey administrator composes, formats, edits, or otherwise creates one or more electronic survey questions. When discussing embodiments of the electronic survey system displayed within a graphical user interface, this disclosure will describe electronic survey templates in terms of question blocks, which are one or more graphical spaces that make up an electronic survey template.

An electronic survey template may include one or more question blocks—and may change over time—as a survey administrator interacts with the administrator device application. To facilitate that change, the electronic survey system 118 provides template tools for the survey administrator 102 to add, delete, modify, or reorder question blocks or electronic survey questions within a question block. For example, electronic survey template 206 includes a question block 208a containing various template tools, such as a question number indicator 209, question block multipliers 210a and 210b, and a question block subtractor 212.

The electronic survey template 206 includes a single question block 208a in FIG. 2A, but it could contain as many question blocks as the survey administrator 102 chooses. To add another question block above question block 208a, the survey administrator 102 selects question block multiplier 210a. To add another question block below question block 208a, such as question block 208b, the survey administrator 102 selects question block multiplier 210b. To delete question block 208a all together, the survey administrator 102 selects question block subtractor 212. This disclosure uses the letter "Q" as an abbreviation before question numbers within an electronic survey template, such as "Q1" for Question 1 and "Q2" for Question 2.

In some embodiments of the electronic survey system 118, the system 118 identifies and provides template tools for an active question block. A survey administrator may add, delete, or modify an electronic survey question within an active question block by selecting from template tools or from various other options and features described below. Additionally, the graphical user interface may include an indicator to identify (for the survey administrator) which question block is active. For example, as shown in FIG. 2A, question number indicator 209 identifies question block 208a as active. As also shown in FIG. 2A, question block 208b is inactive and has dotted borders to indicate that the administrator device 104 has yet to populate question block 208b within the graphical user interface 204.

As shown in FIG. 2A, question block 208a constitutes a blank graphical space in which the survey administrator 102 may create or edit an electronic survey question. To help with creating an electronic survey question, the electronic survey system 118 provides a question type menu 214 (within the graphical user interface 204) that provides various survey question types 232 from which to choose. The term "survey question type" refers to a question format for an electronic survey question. Electronic survey questions can come in various other question types including, but not limited to, multiple choice, text entry questions, rank or ordering questions, matrix or table questions, signature questions, hot spot questions, heat map questions, or CAPTCHA verification questions.

As shown in FIG. 2A, the question type menu 214 can include standard questions 216 and authenticating questions 218. In one or more other embodiments, additional question types can include multimedia questions (e.g., questions with digital video, audio, or images), specialty questions (e.g., heat map, Net Promoter Score®), or other types of electronic survey questions. In other words, the survey question types 232 displayed within the question type menu 214 are merely examples and may comprise many alternative or additional survey question types.

As mentioned above, the question type menu 214 includes standard question type options 216. As used herein, the term "standard question" refers to any electronic survey question that is not of an authenticating question type. For instance, as shown in FIG. 2A, standard question type options 216 can include a multiple choice question option, a matrix table question option, a text entry question option, and a rank order question option. Generally speaking, as discussed in more detail below, the survey administrator 102 can interact with a particular option from the standard type question options 216 to create a standard type question.

As also illustrated in FIG. 2, the question type menu 214 further includes authenticating question type options 218. As stated above, an authenticating question refers to a type of electronic survey question that includes a prompt for a respondent to provide user input that may be used to authenticate information about the survey respondent. This disclosure refers to information to be authenticated as "authenticating information." Authenticating information can include any type of data that the electronic survey system analyzes, references, compares, or otherwise uses to authenticate a survey respondent (e.g., a survey respondent's identity) or a characteristic of a survey respondent (e.g., biographic, demographic, or geographic information of a respondent). For example, authenticating information can include an electronic representation of a survey respondent's signature; biometric information associated with a survey respondent, such as a digital image of a survey respondent or digital audio captured from a survey respondent (e.g., a voice print); biographic, demographic, or geographic information associated with a survey respondent, such as a name, age, ethnicity, gender, birthdate, country of origin, citizenship, address, school, occupation, employer, political party, social security number, credit history, loan information, or credit card number of a survey respondent that, in some instances, can be compared to or authenticated with reference to a database; or any other data that can be communicated from a respondent device 110 to the electronic survey system 118.

Accordingly, to create an electronic survey question to collect various types of authenticating information, FIG. 2 shows that the question type menu 214 includes multiple types of authenticating question type options 218. For example, FIG. 2 illustrates that the authenticating question type options 218 include a signature question option 224, an image capture question option 226, a fingerprint capture question option 228, and a voiceprint capture question option 230. In other embodiments, the graphical user interface 204 can include additional authenticating question type options 218 that can be used to collect various other types of authenticating information.

The survey administrator 102 may select any individual survey question type 232 by using a touch gesture, a click, or other input interaction via a user input device. In some embodiments, for example, the survey administrator 102 can interact with the graphical user interface 204 using a user input device (e.g., touch screen, mouse, trackpad, keyboard, etc.) to select one of the standard question type options 216 or one of the authenticating question type options 218 to associate with question block 208a. For instance, the survey administrator 102 can use the user input device to select the check box associated with a question type option, such as signature question option 224. Alternatively, the survey administrator can select a question type option by using the user input device to drag and drop an icon (associated with a question type option) into the question block 208a.

Based on the survey administrator 102 selecting a question type option, the electronic survey system 118 associates one or more question components with an electronic survey question within an active question block. For example, as illustrated in FIG. 2A, if the user selects a question type option while question block 208a is active, the electronic survey system 118 associates one or more question components corresponding to the selected question type option with Question 1 or "Q1" (inside question block 208a). Question components may include, for example, one or more instructions that—when executed by a processor—provide various features or functionalities to an electronic survey question. In some embodiments of the electronic survey system 118, question components include graphical components. For example, when the survey administrator 102 selects the signature question type option 224, the electronic survey system 118 updates the graphical user interface 204 to include a graphical component of a signature field within question block 208a, as described further below. Moreover, question components can include feature components that enable an administration of an electronic survey question. For example, based on the survey administrator 102 selecting the signature question type option 224, the electronic survey system 118 can associate one or more components that instruct a respondent device to accept a user's signature via a touch screen as user input or via a text of a typed signature (e.g., a typed signature indicated by a "/S/"), provide the user's signature in one or more formats to the electronic survey system 118 as a response, and direct the electronic survey system 118 to analyze the response and take one or more additional actions based on the analysis of the response.

In addition to selecting a question type, the electronic survey system 118 can provide (e.g., via the graphical user interface 204) various other selectable options to allow a survey administrator to associate one or more question components with a particular electronic survey question. For instance, question components can also be based on validation options. A validation option provides a survey administrator with an option to instruct the electronic survey system to validate whether a survey respondent provides (or does not provide) certain information in response to an electronic survey question. For example, when the survey administrator 102 selects a force signature validation option, the electronic survey system 118 associates question components with an electronic survey question to validate whether a survey respondent has digitally drawn a signature within a signature field. In some embodiments, the question components that correspond to a validation option include a validation rule. To continue the example from above, some embodiments of the validation rule instruct the electronic survey system 118 to validate—every time a survey respondent responds to a signature question—whether the survey respondent has digitally drawn a signature within the signature field.

In addition, question components may also include authentication options. An authentication option provides a survey administrator with an option to instruct the electronic survey system 118 to authenticate information provided by a survey respondent. For example, when the survey administrator 102 selects an authenticate signature option, the electronic survey system 118 associates question components with an electronic survey question to authenticate whether a digitally drawn signature matches a previously digitally drawn signature associated with the survey respondent. The term "digitally drawn signature" refers to any signature (e.g., initials, a name, a code) drawn using a computer device, including, but not limited to, a signature drawn with a mouse, stylus, or touch gesture using a computer interface (e.g., a finger drawing a signature on a touch screen). In some embodiments, a digitally drawn signature includes a digital file of a handwritten signature.

Additionally, in some embodiments, the question components that correspond to an authentication option include a logic rule. For instance, and to continue the example from above, some embodiments of the logic rule instruct the electronic survey system 118 to authenticate whether a digitally drawn signature from a survey respondent matches a previously digitally drawn signature associated with the survey respondent.

Question components may also include various display logic rules and/or skip logic rules. A display logic rule, for example, instructs the electronic survey system to identify and/or provide certain electronic survey questions during an administration of an electronic survey—depending on a survey respondent's response to another electronic survey question. By contrast, a skip logic rule instructs the electronic survey system to identify and/or skip certain electronic survey questions during an administration of an electronic survey—depending on a survey respondent's response to another electronic survey question. For example, when the survey administrator 102 selects a skip logic option—which triggers a skip logic rule—the electronic survey system 118 associates question components with an electronic survey question to determine whether to skip one or more electronic survey questions associated with an electronic survey depending on a survey respondent's response to an electronic survey question.

Figure 2B:
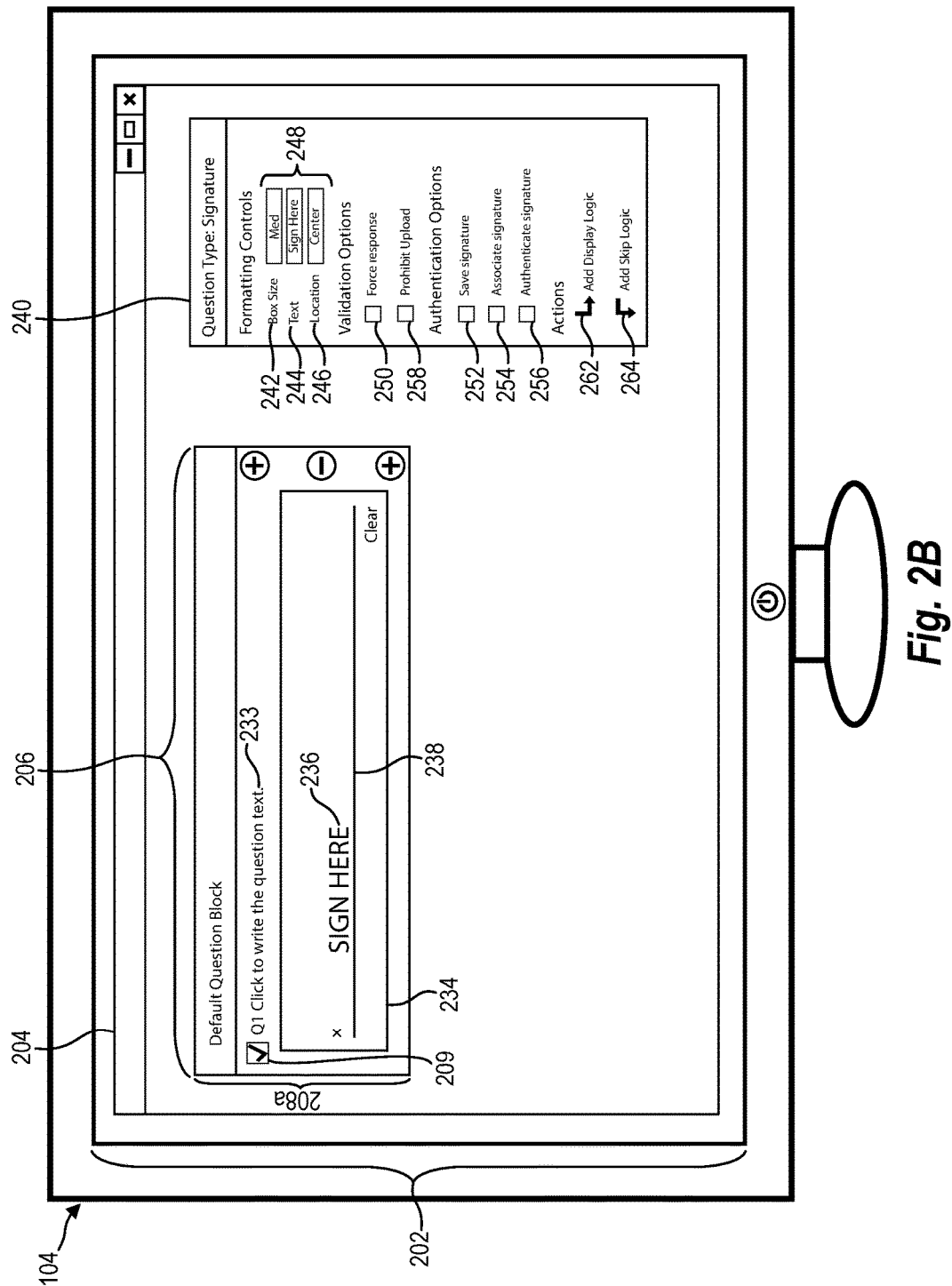

In one or more embodiments, based on the survey administrator 102 selecting a survey question type, the electronic survey system 118 updates the graphical user interface 204 to include features and functions corresponding to the selected question type option. For example, and as shown in FIG. 2B, based on the survey administrator's 102 selection of the signature question option 224 (shown in FIG. 2A), the electronic survey system 118 updates the graphical user interface 204 to include a signature field 234 within question block 208a. The term "signature field" refers to a space in which a user (e.g., a survey respondent) digitally draws a signature. The signature field may contain other visual features that can be formatted or removed, including, for example, a line on which a survey respondent digitally draws a signature or text that states, "SIGN HERE," as illustrated in FIG. 2B.

In some embodiments, upon receiving a selection from the survey administrator 102 of a survey question type from question type menu 214, the electronic survey system 118 updates the graphical user interface 204 to include default text and graphics associated with the selected survey question type. For example, if the survey administrator 102 selects the signature question option 224, the electronic survey system 118 automatically updates question block 208a to include a signature field 234, a signature line 238, and a signature text 236 "SIGN HERE," as shown in FIG. 2B. By selecting the default text, the survey administrator 102 can edit and modify the signature text 236. Alternatively, and as another example, if the survey administrator 102 selects the multiple choice question type 216, the electronic survey system 118 automatically provides (within question block 208a) a default text, "Click to write the question text" followed by multiple selectable answer bubbles—along with the corresponding text, "Click to write Choice 1," "Click to write Choice 2," and "Click to write Choice 3."

As indicated by some of the features and options depicted in FIG. 2A, the electronic survey system 118 provides tremendous flexibility in creating an electronic survey compared to conventional electronic survey systems. For instance, an electronic survey template and corresponding menus (e.g., the electronic survey template 206 and the question type menu 214) provide options to add, delete, modify, reorder, move, or duplicate question blocks—or electronic survey questions within a question block—at any location within an electronic survey. For example, the question type menu 214 enables the electronic survey system 118 to insert any question type (e.g., standard questions and authentication questions) within an electronic survey question. As described in more detail below, the electronic survey system 118 provides other menus with options to associate electronic survey questions and control the order of electronic survey questions presented to a survey respondent in an easy-to-use template.

As noted above, some embodiments of the electronic survey system provide features and functionalities that correspond to authenticating questions, such as validation options, authenticating options, display logic options, and skip logic options. FIG. 2B illustrates an example of an electronic survey template that includes features and functionalities for an authenticating question. As shown in FIG. 2B, administrator device 104 displays the graphical user interface 204 with the signature field 234, a signature question 233, and a signature menu 240. In this particular embodiment, the display screen 202 automatically displays the signature field 234, signature question 233, and signature menu 240 in response to the survey administrator 102 selecting the signature question option 224 (shown in FIG. 2A). As explained above, the electronic survey system 118 associates question components with question block 208 to provide functions underlying the signature filed 234, signature question 233, and signature menu 240.

Some embodiments of the electronic survey system 118 provide a default text for authenticating questions, including a default placeholder text or a default prompt for a survey respondent to input authenticating information. As shown in FIG. 2B, for example, the default text of signature question 233 states, "Click to write the question text." As that text indicates, the survey administrator 102 may click on the signature question 233—or use a touch gesture or other operation—to select the signature question 233 to type in an alternative text, such as, "Please sign your name." Alternatively, the default text of signature question 233 may state, "Please sign your name."

Additionally, some embodiments of the electronic survey system 118 provide an electronic survey template that includes editing or formatting options. As shown in FIG. 2B, for example, once the electronic survey system 118 has updated the graphical user interface 204 to include the electronic survey template 206—including the signature field 234—the survey administrator 102 may interact with the graphical user interface 204 to, for example, edit, format, or apply authentication or validation options to the question block 208a. As shown in FIG. 2B, the check-marked box next to Q1 indicates that the menu to the right of the electronic survey template 206 (that is, the signature menu 240) corresponds to Q1. Because the survey administrator 102 selected the signature question option 224—and the electronic survey system 118 received an indication of that selection—the menu includes options corresponding to the signature question option 224. In an alternative embodiment, had the survey administrator 102 selected a different survey question type—the text entry question option 220, for example—the menu to the right of the electronic survey template 206 would display options corresponding to the selected survey question type.

In some embodiments of the electronic survey system 118, the system 118 provides formatting controls for the survey administrator 102 to adjust the format of an electronic survey question, including authenticating questions. For example, as shown in FIG. 2B, the graphical user interface 204 includes a set of formatting controls 248 from which the survey administrator 102 may choose, including a box size control 242, a signature text control 244, and a signature field location control 246. A person of ordinary skill in the art will recognize that other formatting controls are possible, including, for example, controls for font, signature line width, or box shape.

As shown in FIG. 2B, the box size control 242 provides the survey administrator 102 with the option to adjust the size of the signature field 234. In this particular embodiment, when the survey administrator 102 selects the box size control 242, the electronic survey system 118 updates the graphical user interface 204 to include a drop-down menu of signature field sizes (not shown), including, but not limited to, the sizes of small, medium, and large. In addition, or alternatively, the survey administrator 102 can adjust the size of the signature field 234 within the question block 208a by selecting the border of the signature field 234—with a touch gesture, click, or other operation—and drag the border in a direction that enlarges or shrinks the size of the signature field 234.

As also shown in FIG. 2B, the signature menu 240 displays the signature text control 244. Within the signature text control 244, the text box shows text entered in by the survey administrator 102. As a default, the text box states, "Sign Here," and is displayed within the signature field 234 above the signature line 238. But the text box—and signature field 234—will include any text entered in by the survey administrator 102. Alternatively, in some embodiments, the survey administrator 102 may select the signature text 236 displayed directly above the signature line 238 with a touch gesture, click, or other operation. Upon selection of the signature text 236, the electronical survey system 118 updates the graphical user interface 204 to include a cursor above the signature line 238 within the signature field 234. Once the cursor appears, the survey administrator 102 may modify the text accordingly.

The signature menu 240 also displays another example formatting control—the signature field location control 246. As shown in FIG. 2B, the signature field location control 246 provides the survey administrator 102 with the option to adjust the location of the signature field 234. In this particular embodiment, when the survey administrator 102 selects the signature field location control 246, the electronic survey system 118 updates the graphical user interface 204 to include a drop-down menu of signature field locations, including, but not limited to, the locations of left, center, and right within the question block 208a. In addition, or alternatively, the electronic survey system 118 enables a survey administrator 102 to adjust the location of the signature field 234 by selecting the center (or some other portion) of the signature field 234—with a touch gesture, click, or other operation—and dragging the signature field 234 to a location of choice within the question block 208a.

As noted above, certain embodiments of the electronic survey system 118 provide one or more validation options for an electronic survey question. As shown in FIG. 2B, the signature menu 240 displays a couple validation options 260, including a force signature response option 250 and a prohibit signature upload option 258. The question components corresponding to the validation options instruct the electronic survey system 118 to validate whether a survey respondent provides (or does not provide) certain information in response to an electronic survey question. For example, question components corresponding to a validation option may force the survey respondent 108 to upload a digital signature file (or digitally draw a signature) in response to an electronic survey question. As another example, question components corresponding to a validation option may prohibit the survey respondent 108 from proceeding to a next electronic survey question until the respondent inputs a correct answer to an electronic survey question.

In some embodiments, the electronic survey system 118 can force a survey respondent to respond to an electronic survey question—during an administration of an electronic survey—before permitting the survey respondent to proceed with another electronic survey question or to finish the electronic survey. Based on the survey administrator's 102 selection of the force signature response option 250 shown in FIG. 2B, for example, the electronic survey system 118 receives an indication of that selection and associates question components with Q1 that will apply a validation rule during an administration of an electronic survey. In this embodiment, the validation rule corresponding to the force signature response option 250 requires the survey respondent 108 to digitally draw a signature in response to Q1 before proceeding to the next electronic survey question or finishing the electronic survey. In other embodiments, the validation rule corresponding to a force signature response option requires the survey respondent 108 to upload a digital signature file in response to an electronic survey question before proceeding to the next electronic survey question or finishing the electronic survey.

In other embodiments, the electronic survey system 118 compares the signature digitally drawn during an administration of an electronic survey to a previously digitally drawn signature associated with a profile of the survey respondent 108 to authenticate that the digitally drawn signature matches the previously digitally drawn signature associated with the profile (e.g., prior to displaying additional electronic survey questions). For example, in certain embodiments, the electronic survey system 118 authenticates the digitally drawn signature by applying traditional signature or handwriting analysis techniques, such as by measuring and comparing the spacing, gestures, or widths of strokes of the digitally drawn signature and the previously digitally drawn signature. As another example, where the electronic survey system 118 electronically captures a digitally drawn signature, the system 118 authenticates the digitally drawn signature by tracking the speed, rhythm, or order of strokes or gestures the survey administrator 102 or the survey respondent 108 inputs into the administrator device 104 or the respondent device 110.

Additionally, some embodiments of the electronic survey system can prevent a survey respondent from uploading a previously saved electronic signature to respond to an electronic survey question that requests a digitally drawn signature, such as Q1. For instance, based on the survey administrator's 102 selection of the prohibit signature upload option 258 shown in FIG. 2B, the electronic survey system 118 receives an indication of that selection and associates question components with Q1 that will prohibit the survey respondent 108 from uploading a digital file to respond to Q1 during an administration of an electronic survey. In some embodiments, when the prohibit signature upload option 258 has been selected, the electronic survey system 118 permits the survey respondent 108 to respond to Q1 by digitally drawing a signature within the signature field 234 only. Moreover, in some embodiments, the electronic survey system 118 prohibits the survey respondent 108 from uploading a digital file of data representing a signature from any source, except for a digital file of data representing a signature captured by the respondent device 110 within a certain time. A person having ordinary skill in the art will recognize that other validation options may be added or used as alternatives to the force signature response option 250 or the prohibit signature upload option 258.

As also noted above, certain embodiments of the electronic survey system 118 provide one or more authentication options for an electronic survey question. The question components corresponding to these authentication options instruct the electronic survey system 118 to authenticate information that a survey respondent has provided in response to an electronic survey question. For example, question components corresponding to an authentication option may assign a timestamp to a digitally drawn signature in response to an electronic survey question. As shown in FIG. 2B, the signature menu 240 includes three authentication options, including a save signature option 252, an associate signature option 254, and an authenticate signature option 256. A person having ordinary skill in the art will recognize that other validation options may be added or used as alternatives.

In some embodiments, the electronic survey system 118 saves the digitally drawn signature by the survey respondent 108, such as saving the signature as a scalable vector graphic (".SVG") file. The .SVG file is merely an example file format. The electronic survey system 118 may save a digitally drawn signature in any suitable digital file format, including, but not limited to, .EMF, .PFX, or .P12 files. For example, when the survey administrator 102 selects the save signature option 252, the electronic survey system 118 receives an indication of that selection and associates question components with Q1 that cause the electronic survey system 118 to save the digitally drawn signature by the survey respondent 108 (in response to Q1) to the server device(s) 116. In some embodiments, the electronic survey system 118 saves the digital file within a database, such as an electronic survey database 518 shown in FIG. 5.

Certain embodiments of the electronic survey system 118 can also associate the digitally drawn signature (saved as an .SVG file or in some other format) with a particular survey respondent. For instance, when the survey administrator 102 selects the associate signature option 254 shown in FIG. 2B the electronic survey system 118 receives an indication of that selection and can associate question components with Q1 that associate the .SVG file created in response to Q1 (or other digital file including the digitally drawn signature) with the particular respondent that provided the digitally drawn signature. For example, the electronic survey system 118 may associate the .SVG file with the survey respondent 108 by saving the .SVG file to a profile or account associated with the survey respondent 108 within the electronic survey database 518 shown in FIG. 5.

In some embodiments, the electronic survey system 118 authenticates the digitally drawn signature by the survey respondent 108. For example, based on the survey administrator 102 selecting the authenticate signature option 256 shown in FIG. 2B, the electronic survey system 118 receives an indication of that selection and associates question components with the corresponding electronic survey question, Q1, that authenticates a digital signature drawn in response to Q1. In this particular embodiment, the question components instruct the electronic survey system 118 to compare the digitally drawn signature by the survey respondent 108 with one or more previously digitally drawn signatures associated with the survey respondent 108, such as an .SVG file of a digitally drawn signature. In some embodiments, the electronic survey system 118 instructs the electronic survey response application 112 to not proceed to the next electronic survey question (or to not finish the electronic survey) until the electronic survey system 118 compares and verifies a match of the digitally drawn signatures.

In some embodiments of the electronic survey system 118, the signature menu 240 may further or alternatively include a match signature option. When the survey administrator 102 selects the match signature option, for example, the electronic survey system 118 associates question components with the corresponding electronic survey question, Q1, that determine whether certain digitally drawn signatures match. In particular, the question components can include a validation rule that instructs the electronic survey system 118 to determine whether the digitally drawn signature by the survey respondent 108 (in response to Q1) matches—to a predetermined confidence level—one or more previously stored digitally drawn signatures associated with the survey respondent 108, such as an .SVG file of a digitally drawn signature. In some such embodiments, if the electronic survey system 118 determines that a digitally drawn signature (or uploaded digital signature file) matches—above a threshold confidence level—one or more previously stored digitally drawn signatures associated with the survey respondent 108, the system 118 rejects the digitally drawn signature as an invalid response to an electronic survey question or sends an alert to the administrator device 104. Similar to the authenticate signature option 256 above, in some embodiments, the electronic survey system 118 directs the electronic survey response application 112 to not proceed to the next electronic survey question (or to not finish the electronic survey) until the electronic survey system 118 determines that the digitally drawn signatures match.

Certain embodiments of the electronic survey system 118 also conditionally identify, skip, or display one or more electronic survey questions—depending on a survey respondent's response to another electronic survey question. As shown in FIG. 2B, the graphical user interface 204 includes a skip logic option 264 and a display logic option 262 as one embodiment of the electronic survey system 118. This disclosure generally refers to the conditional skip or display of electronic survey questions as "skip logic" and "display logic." The term "skip logic" refers to one or more question components that include a logic rule that conditionally skips one or more electronic survey questions depending on a survey respondent's response to an administered electronic survey question. For example, a skip logic rule may skip a question asking for a survey respondent to describe his satisfaction with a product if the survey respondent has responded to a preceding question by indicating he has not used the product.

The term "display logic" refers to one or more question components that include a logic rule that conditionally identifies or displays one or more electronic survey questions depending on a survey respondent's response to a preceding electronic survey question. For example, a display logic rule may display a question asking for a survey respondent's birthdate if the survey respondent has responded to a preceding question by digitally drawing a signature that matches—to a predetermined confidence level—a previously stored digitally drawn signature associated with the survey respondent.

Figure 2C:
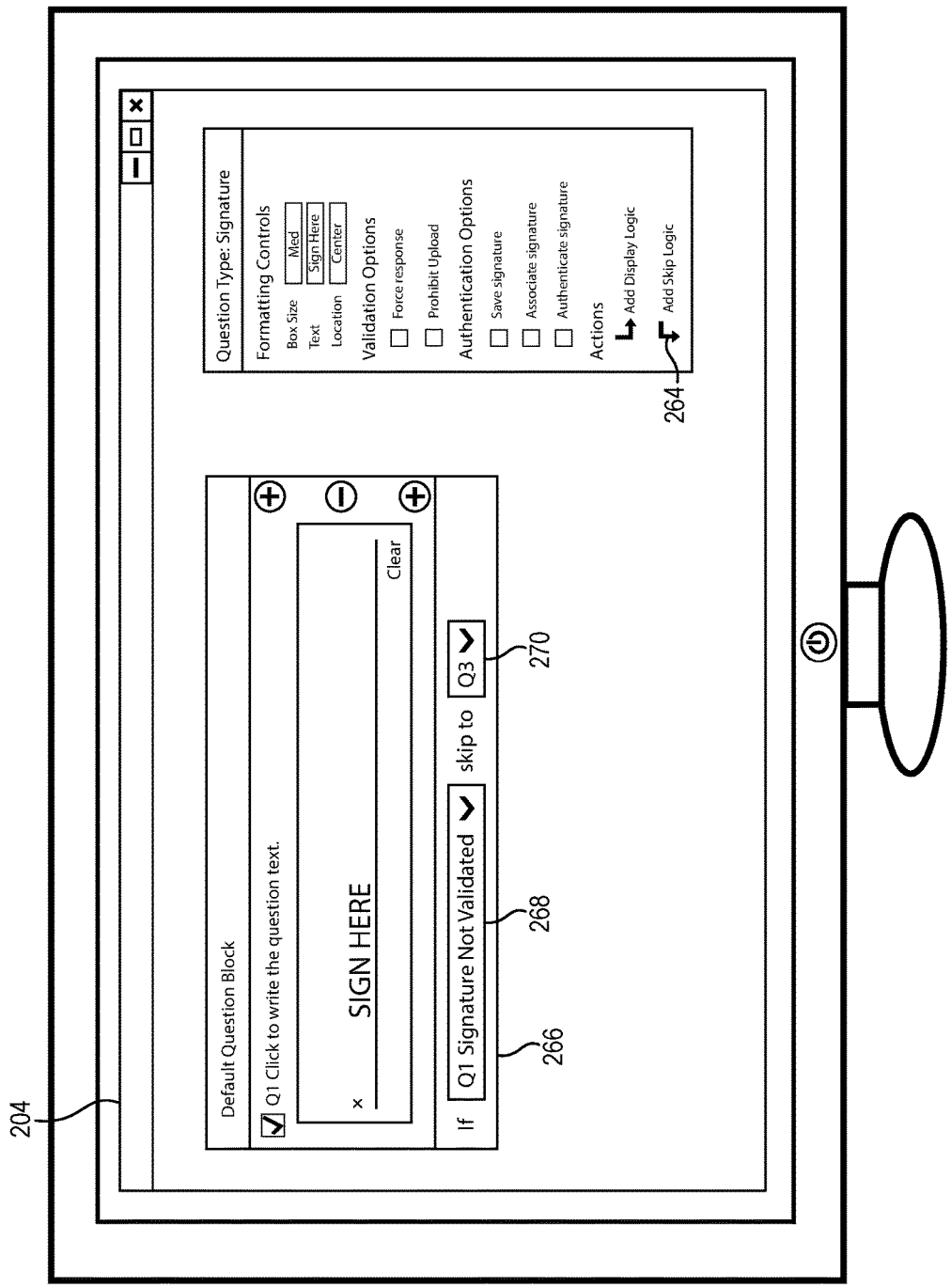

Accordingly, based on the survey administrator 102 selecting the skip logic option 264 shown in FIG. 2B, the electronic survey system 118 updates the graphical user interface 204 to include options for conditionally skipping one or more electronic survey questions. For example, when the survey administrator 102 selects the skip logic option 264 shown in FIG. 2B, the electronic survey system 118 updates the graphical user interface to include a set of logic rule options to skip a next electronic survey question, as shown in FIG. 2C. The graphical user interface 204 of FIG. 2C includes a skip logic option box 266, which in turn includes a skip condition drop-down menu 268 and a skip result drop-down menu 270.

The skip logic option box 266 shows optional conditions that include corresponding question components that control skip logic rules. For example, when the optional conditions shown in skip logic option box 266 are satisfied, the electronic survey system 118 skips to Q3 during an administration of an electronic survey. The text within the skip logic option box 266—including the text within the skip condition drop-down menu 268 and the skip result drop-down menu 270—indicates how a selected skip logic rule would apply to Q1. That text states, "If Q1 Signature Not Validated ∨ Skip To Q3 ∨ ." Accordingly, when the survey administrator 102 selects the options shown in skip logic option box 266, the electronic survey system 118 associates one or more question components with Q1 that skip to Q3 if the electronic survey system 118 does not validate a signature digitally drawn in response to Q1.

In some embodiments of the electronic survey system 118, the skip condition drop-down menu 268 and the skip result drop-down menu 270 include various other logic rule options within their respective drop-down menus. As shown in FIG. 2C, for example, the skip condition drop-down menu 268 includes "Q1 Signature Not Validated ∨" as a first conditional option, and the skip result drop-down menu 270 includes "Q3" as the first electronic survey question number. But when the survey administrator 102 selects the skip condition drop-down menu 268, the display screen 202 displays other skip condition options (not shown) through the graphical user interface 204. Similarly, when the survey administrator 102 selects the skip result drop-down menu 270, the display screen 202 displays other electronic survey question numbers or, alternatively, places in the electronic survey to which the electronic survey system 118 may skip during an administration of an electronic survey.

For example, the skip condition drop-down menu 268 may contain the skip condition options "Q1 Signature Validated," "Q1 Signature Not Validated," "Q1 Signature Digitally Drawn," or "Q1 Signature Not Digitally Drawn." Additionally, the skip result drop-down menu 270 may contain options "Q4," "Q5," "Q6," or "End of Survey." When the survey administrator 102 selects from the options shown in the skip condition drop-down menu 268 and the skip result drop-down menu 270, the electronic survey system 118 associates question components with the electronic survey questions corresponding to those selections and those question components instruct the electronic survey system 118 to skip one or more electronic survey questions (consistent with the selected options) during an administration of an electronic survey.

Figure 3A:
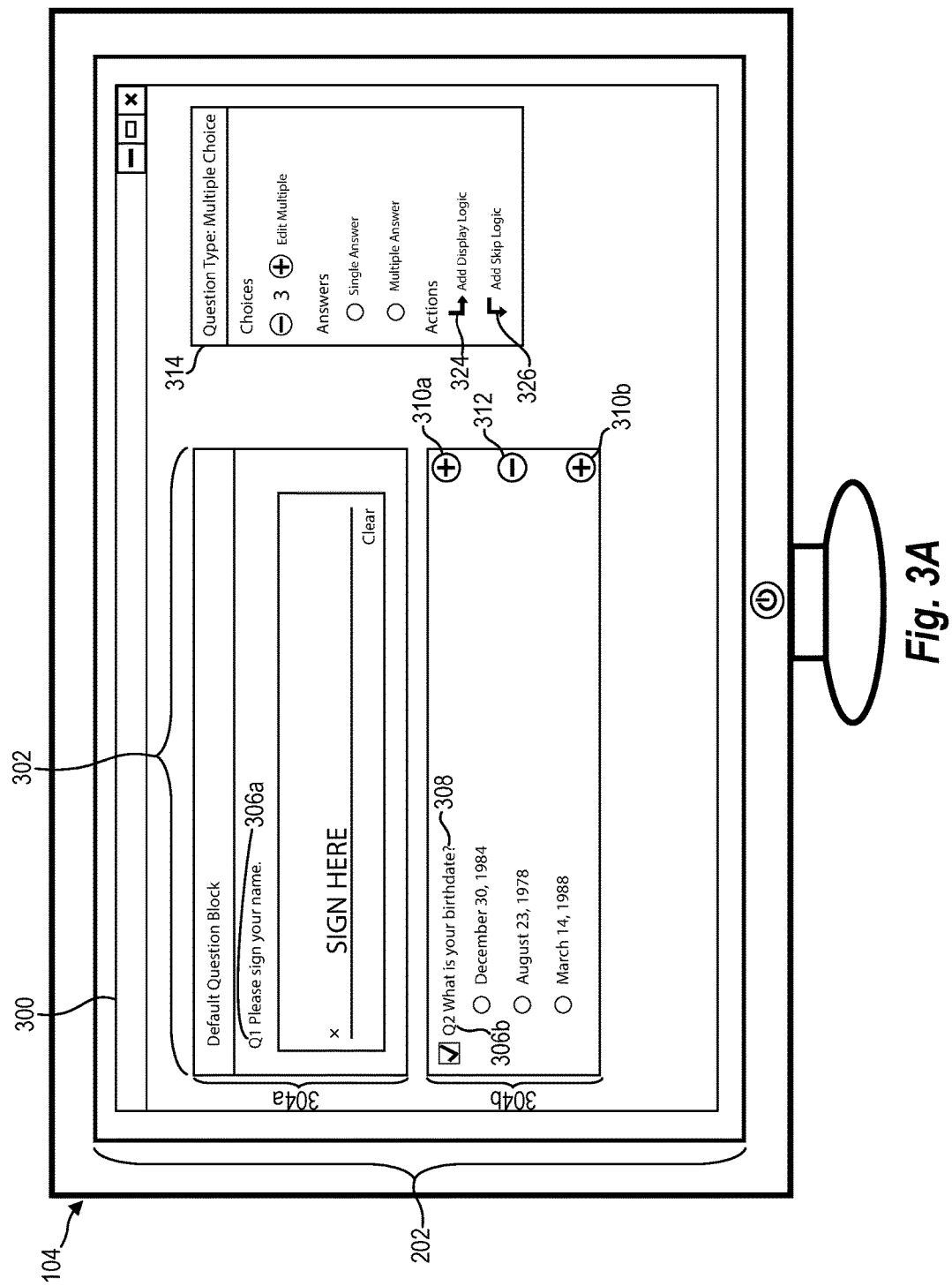
FIGS. 3A-3B illustrate another graphical user interface showing a plurality of views of an electronic survey template in accordance with one or more embodiments.
Figure 3B:
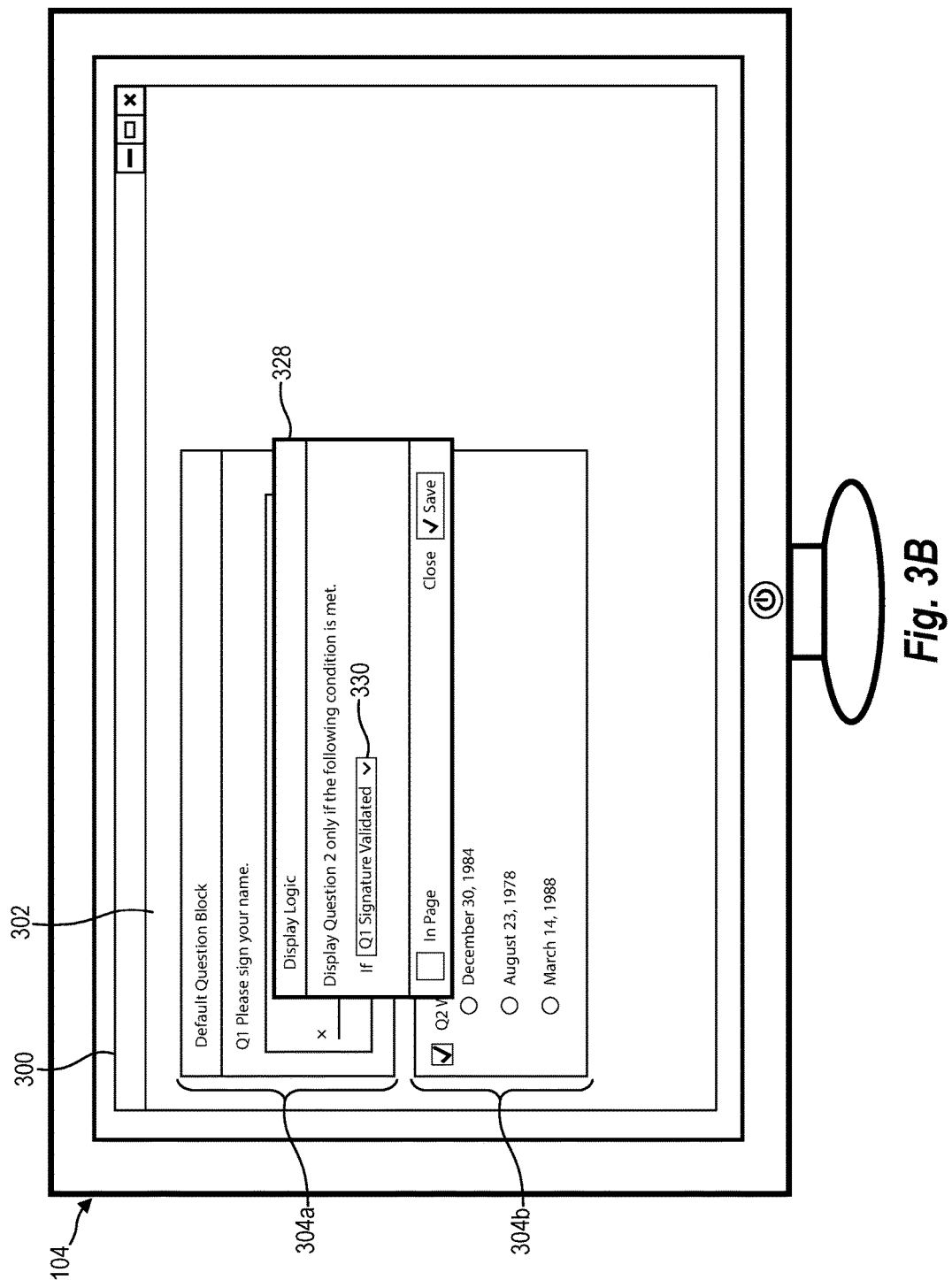

Turning now to FIGS. 3A-3B, these figures generally illustrate examples of the administrator device 104 displaying an electronic survey template 302—which includes multiple electronic survey questions—within the graphical user interface 300. FIG. 3A illustrates the graphical user interface 300 including the electronic survey template 302, which in turn includes question blocks 304a and 304b. Question blocks 304a and 304b contain question number indicators 306a and 306b, respectively, and corresponding electronic survey questions. Question block 304b further comprises multiple choice question 308, question block multipliers 310a and 310b, and question block subtractor 312. Question block multipliers 310a and 310b and question block subtractor 312 function similarly to question block multipliers 210a and 210b and question block subtractor 212, respectively.

As noted above, some embodiments of the electronic survey system 118 provide the survey administrator 102 with display logic options, that is, options that conditionally identify or display one or more next electronic survey questions—depending on a survey respondent's response to a preceding electronic survey question. As shown in FIG. 3A, for example, a multiple choice menu 314 includes a display logic option 324. When the survey administrator 102 selects the display logic option 324, the electronic survey system 118 updates the graphical user interface 300 to include logic rule options for conditionally identifying and/or displaying one or more electronic survey questions. In some embodiments, when the survey administrator 102 selects the display logic option 324, the electronic survey system 118 provides a logic rule option (as shown in FIG. 3B) for conditionally displaying Q2 depending on the response from survey respondent 108 to a preceding electronic survey question.

As mentioned, FIG. 3B illustrates a logic rule option for displaying an electronic survey question, Q2. In particular, the graphical user interface 300 includes a display logic option box 328. The display logic option box 328 shows optional conditions that include corresponding question components that control display logic rules. For example, when the optional conditions shown in display logic option box 328 are satisfied, the electronic survey system 118 provides Q2 during an administration of an electronic survey. The text within the display logic option box 328 indicates how a logic rule will apply to Q2. That text states, "Display Question 2 only if the following condition is met. If Q1 Signature Validated ∨." Accordingly, when the survey administrator 102 selects the option shown in the display logic option box 328, the electronic survey system 118 associates question components with Q1 that display Q2 if the electronic survey system 118 validates a signature digitally drawn in response to Q1.

In some embodiments of the electronic survey system 118, the display logic option box 328 further contains a display logic drop-down menu 330, which contains a list of conditional options with text. As shown in FIG. 3B, for example, the display logic drop-down menu 330 includes "Q1 Signature Validated ∨" as the first conditional option. When the survey administrator 102 selects the display logic drop-down menu 330, the display screen 202 displays other conditional options (not shown) through graphical user interface 302. For example, the display logic drop-down menu 330 may contain the additional options "Q1 Signature Not Validated,"

"Q1 Signature Digitally Drawn,"   or

"Q1 Signature Not Digitally Drawn." When the survey administrator 102 selects one of these conditional options from within the display logic drop-down menu 330, the electronic survey system 118 associated question components with the electronic survey questions corresponding to those selections and the question components instruction the electronic survey system 18 to display one or more electronic survey question (consistent with the selected options) during an administration of an electronic survey.

Figure 4A:
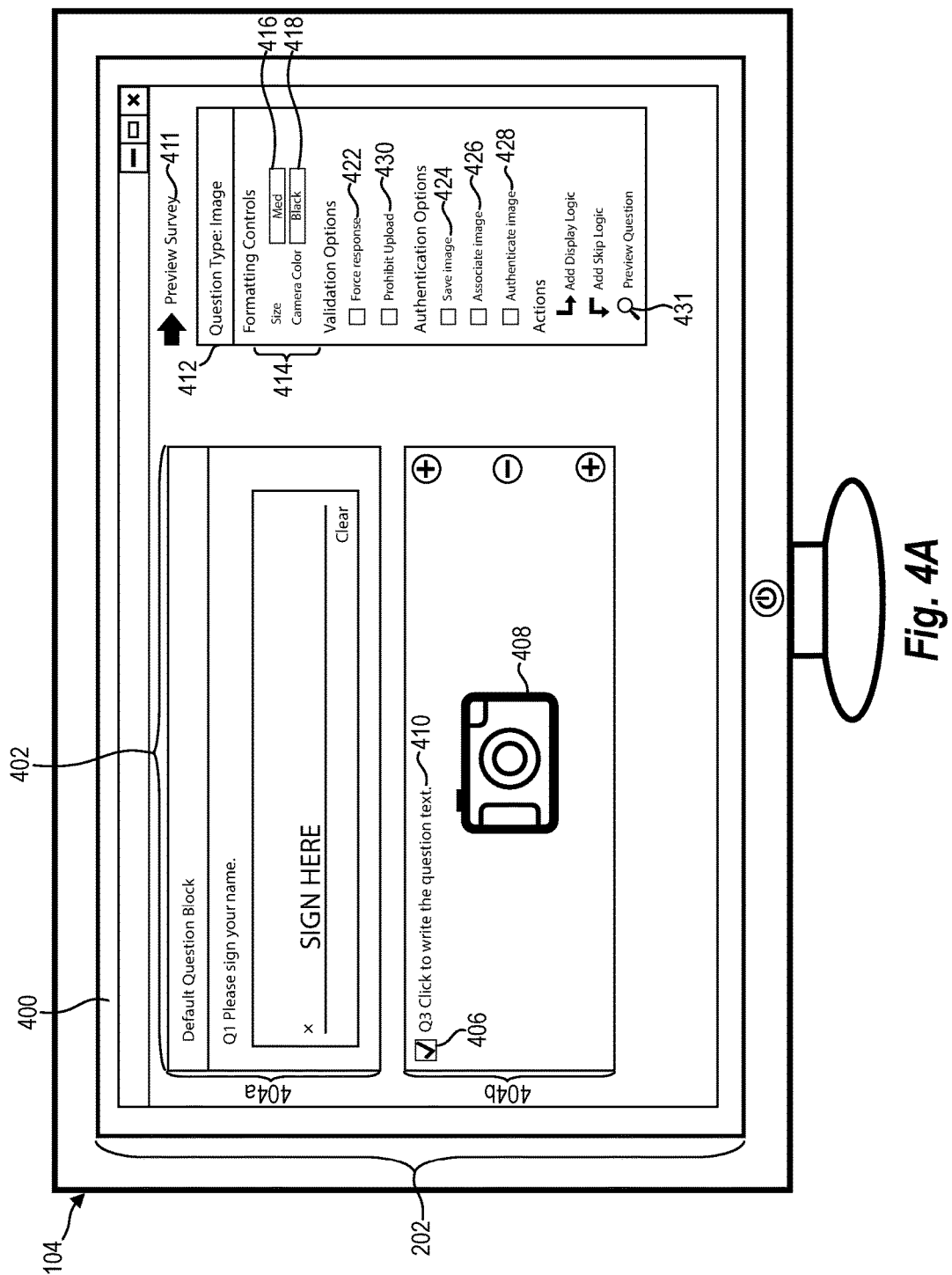
FIGS. 4A-4D illustrate another graphical user interface showing a plurality of potential views for presentation during the creation of an interactive electronic survey question in accordance with one or more embodiments.

As noted above, certain embodiments of the electronic survey system 118 provide various types of authenticating questions. An authenticating question includes a prompt for a survey respondent to provide user input that may be used to authenticate information about the survey respondent. For example, FIG. 4A illustrates the administrator device 104 displaying an electronic survey template 402 with multiple authenticating questions—Q1 and Q3. Q1 is a signature question corresponding to a signature question option; Q3 is an image capture question corresponding to an image capture question option. A question number indicator 406 (with a check-marked box next to Q3) indicates that Q3 is active and that an image menu 412 corresponds to Q3.

Similar to the elements in question block 208a of FIG. 2B corresponding to the signature question, question block 404b contains elements that prompt and facilitate capturing authenticating information. In particular, FIG. 4A illustrates that question block 404b contains an image capture question 410 and an image collection element 408. The default text of the image capture question 410 states, "Click to write the question text." As that text suggests, the survey administrator 102 may select the image capture question 410—with a click, touch gesture, or other operation—to type in an alternative text, such as, "Please take a headshot" or "Please take a photo of yourself." Alternatively, the default text of image capture question 410 may state, "Please take a headshot" or "Please take a photo of yourself."

In some embodiments of the electronic survey system 118, the image collection element 408 is an interactive element that, when selected by a user (e.g., the survey respondent 108), captures a digital image of the user using a camera on a user device. For example, when the survey administrator 102 selects an image capture question option corresponding to question block 404b, the electronic survey system 118 associates question components with the image collection element 408 that facilitate capturing an image from a user device. In particular, during administration of an electronic survey containing Q3, the electronic survey system 118 activates certain question components corresponding to the image collection element 408 that facilitate capturing an image of a survey respondent. In some embodiments, the electronic survey response application 112 uses a camera of the respondent device 110 to capture an image of the survey respondent 108.

Upon the graphical user interface 400 displaying the electronic survey template 402—including image capture question 410 and image collection element 408—the survey administrator 102 may interact with the graphical user interface 400 to edit, format, or apply validation or authentication options to Q3. In some embodiments, the electronic survey system 118 provides formatting controls for the survey administrator 102 to adjust the format of the image collection element 408.

For example, as shown in FIG. 4A, the electronic survey system 118 provides a camera icon size control 416 and a camera icon color control 418. These formatting controls function similarly to formatting controls 248 described above. Accordingly, the survey administrator 102 may adjust the camera icon size for the image collection element 408 by interacting with the camera icon size control 416, as well as adjust the color of the camera icon for the image collection element 408 by interacting with the camera icon color control 418. A person having ordinary skill in the art will recognize that other formatting controls are possible, including, for example, controls that adjust the font of the text of the image capture question 410.

As mentioned above, certain embodiments of the electronic survey system 118 provide one or more validation options for an electronic survey question. FIG. 4A illustrates two such validation options. As shown in FIG. 4A, the image menu 412 includes a force image response option 422 and a prohibit image upload option 430. A person having ordinary skill in the art will recognize that other validation options may be added or used as alternatives.

The force image response option 422 functions similarly to the force signature response option 250. For example, when the survey administrator 102 selects the force image response option 422 shown in FIG. 4A, the electronic survey system 118 receives an indication of that selection and associates question components with Q3 that apply a validation rule to Q3 during an administration of an electronic survey. Accordingly, the validation rule corresponding to the force image response option 422 requires the survey respondent 108 to capture a digital image using the image collection element 408—or upload a digital image—before proceeding to the next electronic survey question or before finishing the electronic survey. In some embodiments, the force image response 422 instructs the electronic survey system 118 to require the survey respondent 108 to capture (or upload) a digital image of the respondent's face.

Additionally, some embodiments of the electronic survey system 118 can prevent the survey respondent 108 from uploading a previously saved digital image file to respond to an electronic survey question requesting an image, such as Q3. For example, when the survey administrator 102 selects the prohibit image upload option 430 shown in FIG. 4A, the electronic survey system 118 receives an indication of that selection and associates question components with Q3 that prohibit the survey respondent 108 from uploading a digital file to respond to Q3. In some embodiments, when the survey administrator 102 has selected the prohibit image upload option 430, the electronic survey system 118 permits the survey respondent 108 to respond to Q3 by capturing a digital image with the image collection element 408 only. In some embodiments, the prohibit image upload option 430 instructs the electronic survey system 118 to require the survey respondent 108 to capture a digital image of his face. Moreover, in some embodiments, the electronic survey system 118 prohibits the survey respondent 108 from uploading a previously saved digital image file from any source, except for a previously saved digital image file captured by the respondent device 110 within a certain time.

As also noted above, certain embodiments of the electronic survey system 118 provide one or more authentication options for an electronic survey question. FIG. 4A illustrates three example authentication options within the image menu 412, including a save image option 424, an associate image option 426, and an authenticate image option 428. A person having ordinary skill in the art will recognize that other authentication options may be added or used as alternatives. For example, the image menu 412 may further include an option to assign a timestamp (not shown) to a captured digital image. The following paragraphs describe each validation option shown within image menu 412.

In some embodiments, the electronic survey system 118 saves the digital image captured by the survey respondent 108 as a digital image file. The digital image file may be in any format, including, but not limited to, .JPEG, .TIFF, .GIF, .BMP, .PNG, .PPM, .PGM, .PBM, .PNM, .WEBP, .HDR, .HEIF, or .BPG format. For example, when the survey administrator 102 selects the save image option 424 shown in FIG. 4A, the electronic system 118 receives an indication of that selection and associates question components with Q3 that instruct the system 118 to save the digital image captured by the survey respondent 108—in response to Q3—to the server device(s) 116. In some embodiments, the electronic survey system 118 saves the digital image file within the electronic survey database 518 shown in FIG. 5.

Certain embodiments of the electronic survey system 118 can also associate a digital image file with a particular survey respondent. For example, when the survey administrator 102 selects the associate image option 426 as shown in FIG. 4A, the electronic survey system 118 receives an indication of that selection and associates question components with Q3 that instruct the system 118 to associate the digital image file—originally captured by a survey respondent in response to Q3—with the survey respondent. For instance, the electronic survey system 118 may associate the digital image file with the survey respondent 108 by saving the digital image file to a profile or account associated with the survey respondent 108.

In some embodiments, the electronic survey system 108 authenticates the digital image captured by a survey respondent by, for example, determining that the digital image shows the survey respondent. For example, when the survey administrator 102 selects the authenticate image option 428 shown in FIG. 4A, the electronic survey system 118 receives an indication of that selection and associates question components with Q3 that instruct the system 118 to authenticate an image captured in response to Q3. In this particular embodiment, the question components instruct the electronic survey system 118 to compare the digital image captured by the survey respondent 108 with one or more previously digitally captured images associated with the survey respondent 108 or some other survey respondent, such as a .JPEG file. In some embodiments, the electronic survey system 108 determines whether the digital image captured or uploaded by the respondent device 110 matches—to a predetermined confidence level—one or more previously digitally captured images associated with the survey respondent 108 or some other survey respondent. Additionally, in some such embodiments, if the electronic survey system 118 determines that the digital image captured or uploaded by the respondent device 110 matches—above a threshold confidence level—one or more previously digitally captured images associated with the survey respondent 108 or some other survey respondent, the system 118 rejects the digital image as an invalid response to an electronic survey question or sends an alert to the administrator device 104. In some embodiments, the electronic survey system 118 instructs the electronic survey response application 112 to not proceed to the next electronic survey question or to not finish the electronic survey until the electronic survey system 118 compares and matches the digitally captured images.

Additionally, in some embodiments of the electronic survey system 118, the system 118 applies facial recognition techniques to compare or analyze digitally captured images. For example, in some embodiments, the electronic survey system 118 detects a face from within one or more of the digitally captured images by the user of respondent device 110 and determines the identity of a person—to a predetermined confidence level—corresponding to the face by comparing the detected features of that face to those in previously captured digital images.

In some embodiments, the electronic survey system 118 determines an identity of a person within a digitally captured image by comparing one or more features of a detected face with a previously identified face that the system 118 has associated with a particular person or profile, such as the profile of the survey respondent 108. When the electronic survey system determines that the detected face does not correspond to a person or profile recognized by the system 118, some embodiments of the system 118 create a profile for the person and associates the digitally captured image (and the detected facial features) with the created profile.

Additionally, in some embodiments, the electronic survey system 118 suggests a profile of a potential survey respondent to which a detected face may correspond by, for example, presenting a representation of the profile in a graphical user interface. Alternatively, the electronic survey system 118 provides the survey administrator 102 or survey respondent 108 options to indicate that the detected face corresponds to a potential survey respondent or profile. Based on prior indications of detected faces by the survey administrator 102 or survey respondent 108, certain embodiments of the electronic survey system 118 use machine-learning techniques to improve the system's 118 recognition of faces within digitally captured images.

As indicated above, certain embodiments of the electronic survey system 118 provide additional authenticating question type options beyond the signature question option 224 and image capture question option 226. For example, some embodiments of the electronic survey system 118 provide authenticating question type options to authenticate the identity of a survey respondent with a fingerprint or voiceprint, such as the fingerprint capture question option 228 and the voiceprint capture question option 230 shown in FIG. 2A. As described below, the fingerprint capture question option 228 and voiceprint capture question option 230 generate some features and functions similar to those of the image capture question depicted in FIG. 4A.

Similar to the authenticating questions described above, the electronic survey system 118 provides a prompt and associated functionality options when creating a fingerprint capture question. In some embodiments, the electronic survey system 118 updates the graphical user interface 400 to include a fingerprint capture prompt when the survey administrator 102 selects the fingerprint capture question option from a question type menu corresponding to an active question block, such as fingerprint capture question option 228. Upon selection of the fingerprint capture question option, the electronic survey system 118 further updates the graphical user interface 400 to include a fingerprint menu (corresponding to the active question block), including formatting controls, authentication and validation options, and display logic and skip logic options—similar to the controls and options displayed within signature menu 240 and image menu 412.

In some embodiments of the electronic survey system 118, the fingerprint capture prompt directs the survey respondent 108 to interact with a touch sensor on the respondent device 110 to capture data representing a fingerprint of the survey respondent 108. For example, the fingerprint capture prompt may include a default text stating, "Place your finger on the home button" or "Lift and rest your finger on the touch sensor repeatedly." But the survey administrator 102 may modify or customize the text as previously described above.

Additionally or alternatively, in some embodiments of the electronic survey system 118, the fingerprint capture prompt includes a fingerprint icon. For example, the fingerprint icon may include lines representing the friction ridges of a human finger, such as the friction ridges of a human thumb. In this particular embodiment, the lines progressively change color as the survey respondent 108 places his finger on the touch sensor of the respondent device 110. In some embodiments, the lines finish changing color when the respondent device 110 has captured sufficient data representing the fingerprint of the survey respondent 108.

The fingerprint menu formatting controls function similar to other formatting controls described above. For example, the fingerprint menu formatting controls include a fingerprint icon size control, a fingerprint icon color control, and a fingerprint prompt font control. When the survey administrator 102 selects the fingerprint icon size control or the fingerprint icon color control, the electronic survey system 118 enables the survey administrator to adjust the size or color of the fingerprint icon, respectively. Moreover, when the survey administrator 102 selects the fingerprint prompt font control, the electronic survey system 118 enables the survey administrator 102 to adjust the font of the text within the fingerprint capture prompt.

The fingerprint menu also includes validation options, which function similarly to the validation options described above. For example, in some embodiments of the electronic survey system 118, the fingerprint menu includes a force fingerprint response option and a prohibit fingerprint upload option. The following paragraphs describe certain embodiments of these particular validation options.

In some embodiments, when the survey administrator 102 selects the force fingerprint response option, the electronic survey system 118 forces the survey respondent 108 to respond to the fingerprint capture prompt—during an administration of an electronic survey—by placing his finger on the touch sensor of the respondent device 110. In this particular embodiment, the survey respondent 108 must place his finger on the touch sensor until it captures sufficient data representing a fingerprint of the survey respondent 108. In other embodiments, when the survey administrator 102 selects the force fingerprint response option, the electronic survey system 118 forces the survey respondent 108 to upload a digital file of data representing a fingerprint of the survey respondent 108 or to place his finger on the touch sensor until it captures sufficient data representing a fingerprint of the survey respondent 108. In yet other embodiments, the electronic survey system 118 compares data representing the fingerprint captured during an administration of an electronic survey to other data representing a fingerprint associated with a profile of the survey respondent 108 or another survey respondent—and authenticates that the captured fingerprint data matches the fingerprint data associated with the profile—before displaying additional electronic survey questions.

Additionally, in some embodiments, when the survey administrator 102 selects the prohibit fingerprint upload option, the electronic survey system 118 prohibits the survey respondent 108 from responding to the fingerprint capture prompt—during an administration of an electronic survey—by uploading a digital file of data representing a fingerprint. In other embodiments, the electronic survey system 118 requires the survey respondent 108 to place his finger on the touch sensor for a certain time—and for the electronic survey system 118 to receive data representing a fingerprint—before displaying additional electronic survey questions. In some embodiments, the electronic survey system 118 prohibits the survey respondent 108 from uploading a digital file of data representing a fingerprint from any source, except for a digital file of data representing a fingerprint captured by the respondent device 110 within a certain time.

The fingerprint menu also includes authentication options, which function similarly to the authentication options described above; that is, the authentication options trigger question components that instruct the electronic survey system 118 to authenticate information provided by a survey respondent. For example, the fingerprint menu includes a save fingerprint option, an associate fingerprint option, an authenticate fingerprint option, and a fingerprint timestamp option. The following paragraphs describe certain embodiments of these authentication options.

Some embodiments of the electronic survey system 118 save data representing a fingerprint—captured during an administration of an electronic survey—in a digital file by itself or with data associated with a response to a particular electronic survey or profile for a particular survey respondent. For example, in some embodiments, when the survey administrator 102 selects the save fingerprint option, the electronic survey system 118 saves a digital file of the data representing the fingerprint of the survey respondent 108 captured by the touch sensor during an administration of an electronic survey. Additionally, some embodiments of the electronic survey system 118 save the data file of the data representing the fingerprint of the survey respondent 108 with a digital file corresponding to responses from a particular survey respondent to an electronic survey.

Additionally, some embodiments of the electronic survey system 118 associate data representing a fingerprint with an account, profile, demographic, or geographic location corresponding to a survey respondent. For example, in some embodiments, when the survey administrator selects the associate fingerprint option, the electronic survey system 118 associates a digital file of the data representing the fingerprint of the survey respondent 108—captured during an administration of an electronic survey—with an account or profile of the survey respondent 108. The electronic survey system 118 may likewise associate the data representing the fingerprint of a survey respondent with a particular demographic or geographic location.

Some embodiments of the electronic survey system 118 authenticate the fingerprint captured by the touch sensor of the respondent device 110. For example, in some embodiments, when the survey administrator 102 selects the authenticate fingerprint option, the electronic survey system 118 receives an indication of that selection and associates question components with the fingerprint question that authenticate the data representing a fingerprint captured in response to the fingerprint capture prompt. In some embodiments, the electronic survey system 118 compares the data representing the fingerprint—captured by the touch sensor of the respondent device 110—with one or more previously captured digital files of data representing a fingerprint of a survey respondent or multiple survey respondents. In some embodiments, the electronic survey system 118 instructs the electronic survey response application 112 to not proceed to the next electronic survey question (or to not finish the electronic survey) until the system 118 compares and matches the digital files of data representing a fingerprint captured during an administration of an electronic survey with previously captured data representing a fingerprint.

Additionally, in some embodiments, the electronic survey system 118 determines whether data representing a fingerprint captured during an administration of an electronic survey matches one or more previously captured data representing a fingerprint. For example, when the survey administrator 102 selects the match fingerprint option, some embodiments of the electronic survey system 118 associate question components with the fingerprint question to instruct the system 118 to determine whether data representing fingerprints match. In this embodiment, the question components instruct the electronic survey system 118 to determine whether the data representing the fingerprint captured by the touch sensor of the respondent device 110 matches—to a predetermined confidence level—one or more previously captured digital files of data representing the fingerprint of the survey respondent 108 or some other survey respondent. In some such embodiments, if the electronic survey system 118 determines that data representing the fingerprint captured by the touch sensor of the respondent device 110 (or uploaded in a digital file) matches—above a threshold confidence level—one or more previously captured digital files of data representing the fingerprint of the survey respondent 108 or some other survey respondent, the system 118 rejects the voiceprint as an invalid response to an electronic survey question or sends an alert to the administrator device 104. In some embodiments, the electronic survey system 118 instructs the electronic survey response application 112 to not proceed to the next electronic survey question (or to not finish the electronic survey) until the system 118 determines that the data representing a fingerprint captured by the respondent device 110 matches one or more previously captured digital files of data representing the fingerprint of the survey respondent 108.

Some embodiments of the electronic survey system 118 assign a timestamp to data representing a fingerprint captured during an administration of an electronic survey. For example, in some embodiments, when the survey administrator 102 selects the fingerprint timestamp option, the electronic survey system 118 assigns a timestamp to the data captured by the respondent device 110 representing a fingerprint. The timestamp may be saved within a digital file containing data representing the fingerprint.

As mentioned above, some embodiments of the electronic survey system 118 provide an option to add another authenticating question—a voiceprint capture question—to an electronic survey template. The term "voiceprint" refers to data representing characteristics of a speaker's voice, such as the voice's accent, pace, pitch, resonance, timber, or tone. In some embodiments, the voiceprint may include a recorded vocal sample, a mathematical formula representing a speaker's voice characteristics, or a graphical representation of a speaker's voice characteristics.

Certain embodiments of the electronic survey system 118 update the graphical user interface 400 to include a voiceprint capture prompt within an active question block when the survey administrator 102 selects a voiceprint capture question option, such as voiceprint capture question option 230 shown in FIG. 2A. Upon selection of the voiceprint capture question option, the electronic survey system 118 further updates the graphical user interface 400 to include a voiceprint menu (corresponding to the active question block), including formatting controls, authentication and validation options, and display logic and skip logic options—similar to the controls and options displayed within signature menu 240 and image menu 412.

In some embodiments of the electronic survey system 118, the voiceprint capture prompt directs the survey respondent 108 to interact with an audio input element on the respondent device 110 to capture data representing a voiceprint of the survey respondent 108. The audio input element on the respondent device 110 includes, but is not limited to, a microphone. For example, in some embodiments, the voiceprint capture prompt includes a microphone icon and a default text stating, "Please press the microphone icon and speak into your device" or "Please press the microphone icon and state your name." But the survey administrator 102 may modify and customize the text.

The voiceprint menu formatting controls function similarly to the formatting controls described above. For example, the voiceprint menu formatting controls include a microphone icon size control, a microphone icon color control, and a voiceprint prompt font control. When the survey administrator 102 selects the microphone icon size control or the microphone icon color control, the electronic survey system 118 enables the survey administrator to adjust the size or color of the microphone icon, respectively. Additionally, when the survey administrator 102 selects the voiceprint prompt font control, the electronic survey system 118 enables the survey administrator 102 to adjust the typeface of the text within the voiceprint capture prompt.

The voiceprint menu also includes validation options, which function similarly to the validation options described above. For example, in some embodiments of the electronic survey system 118, the voiceprint menu includes a force voiceprint response option and a prohibit voiceprint upload option. The following paragraphs describe certain embodiments of these validation options.

In some embodiments, when the survey administrator 102 selects the force voiceprint response option, the electronic survey system 118 requires the survey respondent 108 to respond to the voiceprint capture prompt—before proceeding to a next electronic survey question during an administration of an electronic survey—by stating his name (or some other word or phrase) into the audio input element of the respondent device 110. In some variations of this embodiment, the survey respondent 108 must repeat his name (or some other word or phrase) into the audio input element until it captures sufficient data representing a voiceprint of the survey respondent 108. In other embodiments, when the survey administrator 102 selects the force voiceprint response option, the electronic survey system 118 forces the survey respondent 108 to upload a digital file of data representing a voiceprint of the survey respondent 108 or to state his name (or some other word or phrase) into the audio input element of the respondent device 110. In yet other embodiments, the electronic survey system 118 compares data representing the voiceprint captured during an administration of an electronic survey to other data representing a voiceprint associated with a profile of the survey respondent 108 or another survey respondent—and authenticates that the captured voiceprint data matches the voiceprint data associated with the profile—before displaying additional electronic survey questions or finishing the electronic survey.

Additionally, in some embodiments, when the survey respondent 102 selects the prohibit voiceprint upload option, the electronic survey system 118 prohibits the survey respondent 108 from responding to the voiceprint capture prompt—during an administration of an electronic survey—by uploading a digital file of data representing a voiceprint. In some embodiments, the electronic survey system 118 prohibits the survey respondent 108 from uploading a digital file of data representing a voiceprint from any source, except for a digital file of data representing a voiceprint captured by the respondent device 110 within a certain time.

The voiceprint menu also includes authentication options, which function similarly to the authentication options described above. For example, the voiceprint menu includes a save voiceprint option, an associate voiceprint option, an authenticate voiceprint option, and a voiceprint timestamp option. The following paragraphs describe certain embodiments of these authentication options.

Some embodiments of the electronic survey system 118 save data representing a voiceprint—captured during an administration of an electronic survey—in a digital file by itself or with data associated with a response to a particular electronic survey or profile for a survey respondent. For example, in some embodiments, when the survey administrator 102 selects the save voiceprint option, the electronic survey system 118 saves a digital file of the data representing the voiceprint of the survey respondent 108 captured by the audio input element during an administration of an electronic survey. Additionally, some embodiments of the electronic survey system 118 save the data file of the data representing the voiceprint of the survey respondent 108 with a digital file corresponding to responses from a particular survey respondent to an electronic survey.

Additionally, some embodiments of the electronic survey system 118 associate data representing a voiceprint with an account, profile, demographic, or geographic location corresponding to a survey respondent. For example, in some embodiments, when the survey respondent 102 selects the associate voiceprint option, the electronic survey system 118 associates a digital file of the data representing the voiceprint of the survey respondent 108—captured during an administration of an electronic survey—with an account or profile of the survey respondent 108. The electronic survey system 118 may likewise associate the data representing the voiceprint of a survey respondent with a particular demographic or geographic location.

Some embodiments of the electronic survey system 118 authenticate the voiceprint captured by the audio input element of the respondent device 110. For example, in some embodiments, when the survey administrator 102 selects the authenticate voiceprint option, the electronic survey system 118 receives an indication of that selection and associates question components with the voiceprint question that authenticate the data representing a voiceprint in response to the voiceprint capture prompt. In some embodiments, the electronic survey system 118 compares the data representing the voiceprint—captured by the audio input element of the respondent device 110—with one or more previously captured digital files of data representing a voiceprint of a survey respondent or multiple survey respondents. In some embodiments, the electronic survey system 118 instructs the electronic survey response application 112 to not proceed to the next electronic survey question (or to not finish the electronic survey) until the system 118 compares and matches the digital files of data representing a voiceprint captured during an administration of an electronic survey with previously captured data representing a voiceprint.

Additionally, in some embodiments, the electronic survey system 118 determines whether data representing a voiceprint captured during an administration of an electronic survey matches one or more previously captured data representing a voiceprint. For example, when the survey administrator 102 selects the match voiceprint option, some embodiments of the electronic survey system 118 associate question components with the voiceprint question to instruct the system 118 to determine whether data representing voiceprints match. In this embodiment, the question components instruct the electronic survey system 118 to determine whether the data representing the voiceprint captured by the audio input element of the respondent device 110 matches—to a predetermined confidence level—one or more previously captured digital files of data representing the voiceprint of the survey respondent 108 or some other survey respondent. In some such embodiments, if the electronic survey system 118 determines that data representing the voiceprint captured by the audio input element of the respondent device 110 (or uploaded in a digital file) matches—above a threshold confidence level—one or more previously captured digital files of data representing the voiceprint of the survey respondent 108 or some other survey respondent, the system 118 rejects the voiceprint as an invalid response to an electronic survey question or sends an alert to the administrator device 104. In some embodiments, the electronic survey system 118 instructs the electronic survey response application 112 to not proceed to the next electronic survey question (or to not finish the electronic survey) until the electronic survey system 118 determines that the data representing a voiceprint captured by the respondent device 110 matches one or more previously captured digital files of data representing the voiceprint of the survey respondent 108.

Some embodiments of the electronic survey system 118 assign a timestamp to data representing a voiceprint captured during an administration of an electronic survey. For example, in some embodiments, when the survey administrator 102 selects the voiceprint timestamp option, the electronic survey system 118 assigns a timestamp to the data captured by the respondent device 110 representing a voiceprint. The timestamp may be saved within a digital file containing data representing the fingerprint.

As mentioned above, some embodiments of the electronic survey system 118 provide a preview of an electronic survey or an electronic survey question. These previews enable the survey respondent 102 to view, interact with, or respond to an electronic survey (or an individual electronic survey question) that has been created within an electronic survey template—as if the survey administrator 102 were the survey respondent 108 during an administration of an electronic survey. Some of the previews show an electronic survey or an individual electronic survey question as they would appear on a screen of a desktop computer or a mobile device. To facilitate these previews, certain embodiments of the electronic survey system 118 provide selectable preview options.

For example, FIG. 4A illustrates the graphical user interface 400 with a couple of preview options—a preview survey option 411 and a preview question option 431. When the survey administrator 102 selects the preview survey option 411, the electronic survey system 118 provides a preview of an interactive version of the electronic survey, including the electronic survey questions within question blocks 404a and 404b.

Figure 4B:
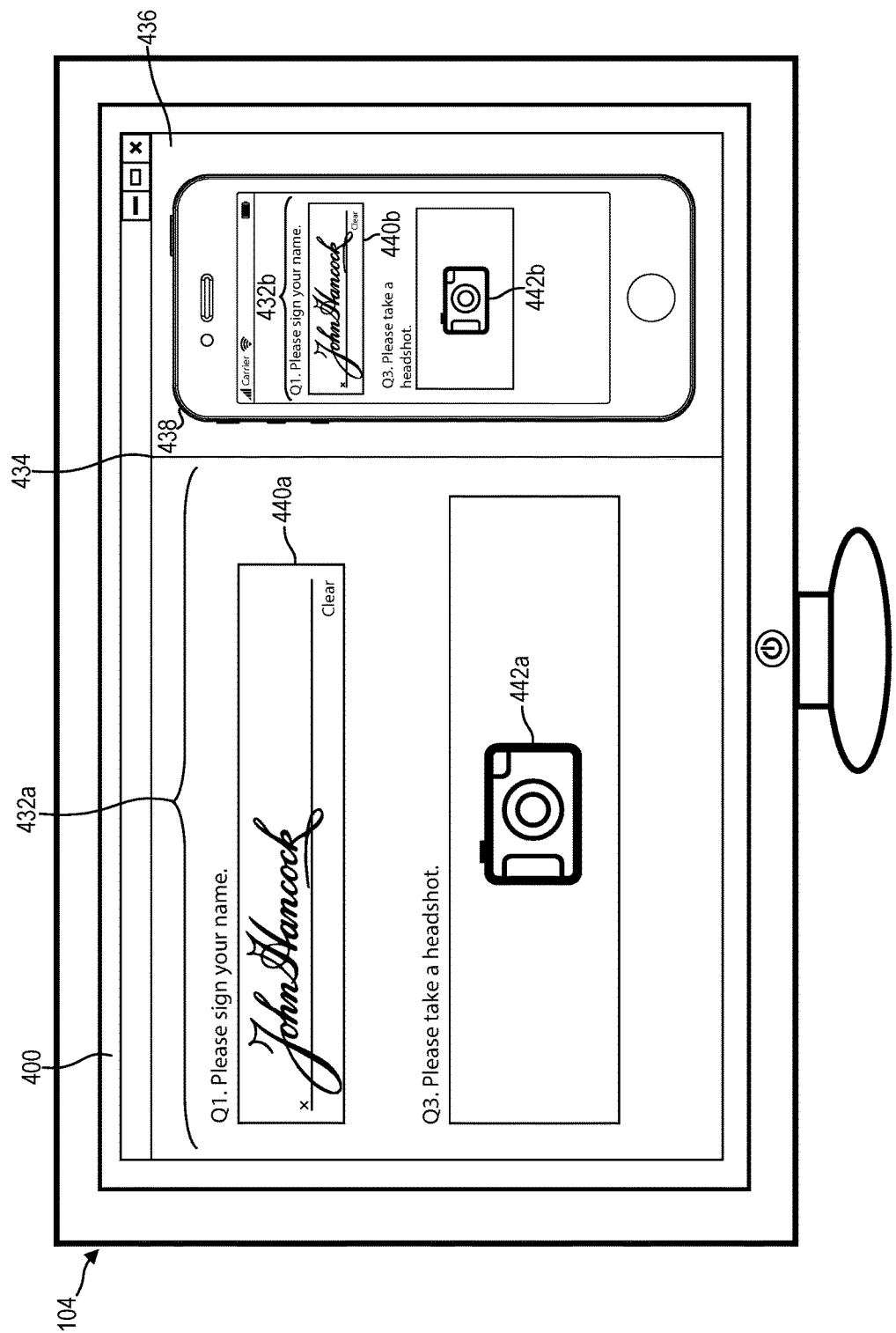

After the survey respondent 102 has selected the preview survey option 411, the electronic survey system 118 provides a preview of the electronic survey the survey respondent 102 created using an electronic survey template. FIG. 4B illustrates an embodiment of the graphical user interface 400 that the electronic survey system 118 provides to the administrator device 104 to preview an interactive electronic survey. For example, when the survey administrator 102 selects the preview survey option 411, the electronic survey system 118 updates the graphical user interface 400 to include interactive electronic surveys 432a and 432b.

As shown in FIG. 4B, the interactive electronic survey 432a depicts the electronic survey template 402 within a screen of a personal computer, desktop, or tablet. The interactive electronic survey 432b depicts the electronic survey template 402 as an electronic survey within a screen of a mobile device. The graphical user interface 400 includes an interface divider 434 that divides the interactive electronic survey 432a from a mobile device window 436. The mobile device window 436 includes the interactive electronic survey 432b within a mobile device depiction 438. Interactive electronic surveys 432a and 432b are merely exemplary. The electronic survey system 118 may provide for preview an interactive electronic survey within a single screen—rather than a split screen as shown in FIG. 4B—or in a format that mimics the display of any computer device.

By providing the interactive electronic survey 432a, the electronic survey system 118 enables the survey administrator 102 to interact with an electronic survey that the survey administrator 102 created—such as the electronic survey illustrated in FIG. 4A—as if the survey administrator 102 were using the respondent device 110 to respond to electronic survey questions. For example, during a preview, the electronic survey system 118 activates certain question components associated with Q1 (shown within the interactive electronic survey 432a or the interactive electronic survey 432b) that allow the survey administrator 102 to interact with Q1 as if the survey administrator 102 were responding to Q1 as the survey respondent 108. Once the electronic survey system 118 has activated certain question components associated with Q1, the administrator device application 106 may detect—and the electronic survey system 118 receives an indication of—strokes from a prolonged mouse click-and-drag, a touch gesture, or other operation that digitally draw a signature within interactive signature fields 440a or 440b of FIG. 4B. As shown in FIG. 4B, the survey administrator 102 has digitally drawn—and the electronic survey system 118 has received an indication of—the signature "John Hancock" within the interactive signature field 440a. Interactive signature field 440b shows a mirror image of "John Hancock."

As another example, during a preview, the electronic survey system 118 activates certain question components associated with Q3 (shown within the interactive electronic survey 432a or 432b) that allow the survey administrator 102 to interact with Q3 as if survey administrator 102 were responding to Q3 as the survey respondent 108. Once the electronic survey system 118 has activated certain question components associated with Q3, the administrator device application 106 may detect—and the electronic survey system 118 may receive an indication of—a selection of interactive image collection element 442a or 442b to capture a digital image of the face of the survey administrator 102 by, for example, using a camera on the administrator device 104. This disclosure further describes and illustrates the functionality of an interactive image collection element similar to 442a and 442b with reference to FIGS. 4C-4D below.

Some embodiments of the electronic survey system 118 provide a preview that displays interactions with a survey administrator on mirror images of an interactive electronic survey. As shown in FIG. 4B, for example, the electronic survey system 118 updates the graphical user interface 400 to include features that depict interactions between the survey administrator 102 and the interactive electronic survey 432a also within the interactive electronic survey 432b, which works as a mirror image of the display within interactive electronic survey 432a. In some embodiments, the electronic survey system 118 likewise updates the graphical user interface 400 to include features that depict interactions between the survey administrator 102 and the interactive electronic survey 432b also within the interactive electronic survey 432a, which works as a mirror image of the display within interactive electronic survey 432b.

Figure 4C:
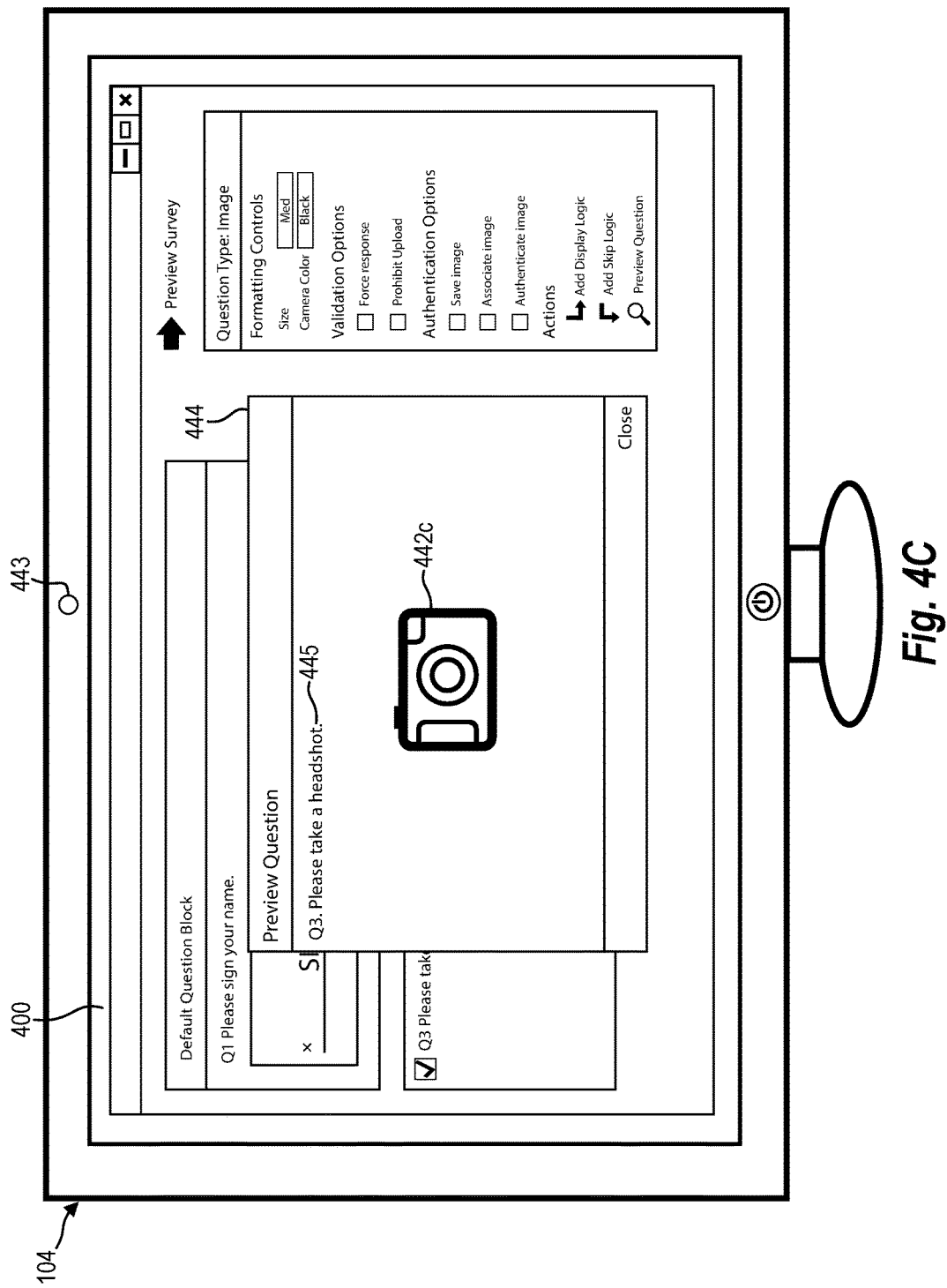

As mentioned above, some embodiments of the electronic survey system 118 provide an option to preview and interact with an electronic survey question individually. FIG. 4C illustrates an example of such a preview. FIG. 4C illustrates an embodiment of the graphical user interface 400 that the electronic survey system 118 provides to the administrator device 104 to allow the survey administrator 102 to preview and interact with Q3 as an interactive electronic survey question. As shown in FIG. 4C, the electronic survey system 118 provides an interactive version of Q3 within an interactive preview question window 444. The electronic survey system 118 may provide the interactive preview question window 444 when the survey administrator 102 selects the preview question option 431 in FIG. 4A. Although this particular figure illustrates a preview of image capture question Q3, certain embodiments of the electronic survey system 118 allow the survey administrator 102 to preview any electronic survey question by itself, including, for example, a signature question, a fingerprint capture question, a voiceprint capture question, or any other authenticating question.

As shown in FIG. 4C, the electronic survey system 118 has updated the graphical user interface 400 to include an interactive image collection element 442c. When the survey administrator 102 selects the interactive image collection element 442c, the electronic survey system 118 instructs the administrator device 104 to capture a digital image. For example, in some embodiments, the electronic survey system 118 instructs the administrator device application 106 to use a camera 443 of the administrator device 104 to capture an image of the survey administrator 102. As shown in FIG. 4C, the interactive preview question window 444 includes an interactive electronic survey question 445, Q3, which states, "Please take a headshot." Accordingly, the survey administrator 102 may test the functionality of the interactive image collection element 442c by capturing a digital image of her face, for example, using the camera 443 of the administrator device 104.

Figure 4D:
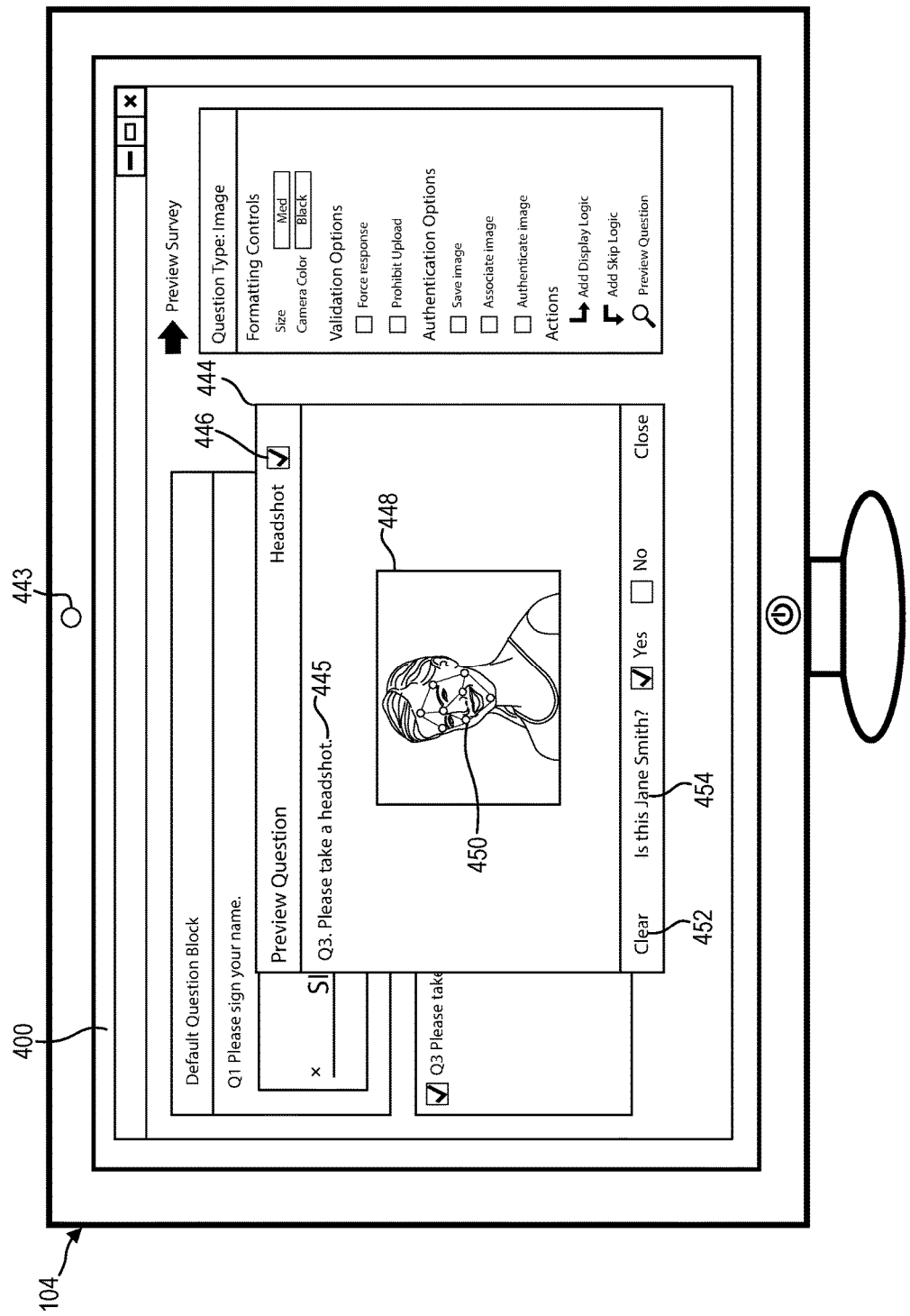

In some embodiments of the electronic survey system 118, once the administrator device 104 has captured an image as part of a preview, the electronic survey system 118 updates the graphical user interface 400 to include the digital image captured by the administrator device 104. FIG. 4D illustrates an example of such a preview. For example, when the survey administrator 102 selects the interactive image collection element 442c, the electronic survey system 118 instructs the administrator device 104 to capture an image and—once the image has been captured—the electronic survey system 118 updates the graphical user interface 400 to include a captured digital image 448 within the interactive preview question window 444. As shown in FIG. 4D, the captured digital image 448 is the digital image the administrator device 104 when the survey administrator 102 selected the interactive image collection element 442c shown in FIG. 4C.

Some embodiments of the electronic survey system 118 also provide an option to delete, update, or modify an image captured during a preview. As shown in FIG. 4D, for example, the electronic survey system 118 has provided a clear option 452, which is shown within the interactive preview question window 444. In this particular embodiment, when the survey administrator 102 selects the clear option 452, the electronic survey system 118 deletes the captured digital image 448 shown in FIG. 4D and—after that deletion—updates the graphical user interface 400 to again include the interactive image collection element 442c shown in FIG. 4C. The clear option 452 thus gives the survey administrator 102 the capability of deleting the captured digital image 448 and recapturing a digital image using the image collection element 442c.

As described above, some embodiments of the electronic survey system 118 apply facial recognition techniques to analyze digitally captured images. FIG. 4D illustrates some of the features and options associated with those facial recognition techniques. For example, in some embodiments, the electronic survey system 118 applies facial recognition techniques to detect and measure the distance among facial features shown in a digital image, including, for example, a hairline, forehead, left eyebrow, right eyebrow, glabella, left eye, right eye, nose bridge, nose tip, left nostril, right nostril, scar, mole, freckle, pimple, left ear, right ear, lip curve, tubercle of the upper lip, top portion of a lip, bottom portion of a lip, mouth corner, or chin. As shown in FIG. 4D, the electronic survey system 118 has detected and measured certain facial features of the face shown in captured digital image 448 and updated the graphical user interface 400 to include facial recognition circles and lines 450 that depict the measured distance among certain facial features of the face shown in the captured digital image 448, including a top point on a forehead, a glabella, a corner of a left eyebrow, a corner of a right eyebrow, a left nostril, a right nostril, a left cheek, and a chin.

As also described above, some embodiments of the electronic survey system 118 detect whether a digital image contains an image of a face and determines an identity of a person—to a predetermined confidence level—corresponding to that face. Additionally, in certain embodiments, the electronic survey system 118 provides an indicator that it has detected a face or an indicator that it has determined an identity of a person corresponding to that face. As shown in FIG. 4D, for example, the electronic survey system 118 has detected a face within the captured digital image 448 and determined an identity of a person—to a predetermined confidence level—corresponding to that face. Accordingly, the electronic survey system 118 has updated the graphical user interface 400 to include a headshot indicator 446 and an identity determination indicator 454 within the interactive preview question window 444.

As shown in FIG. 4D, the headshot indicator 446 indicates that the captured digital image 448 contains an image of a face. Specifically, the headshot indicator 446 includes the word "Headshot" next to a check-mark box. The graphical user interface 400 includes a check within the check-mark box of the headshot indicator 446, which indicates that the captured digital image 448 includes an image of a face. If the electronic survey system 118 had not detected an image of a face, however, the electronic survey system 118 would not have updated the graphical user interface 400 to include a check within the check-mark box of the headshot indicator 446.

In some embodiments, the electronic survey system 118 provides an option for the survey administrator 102 (or the survey respondent 108 during an administration of an electronic survey) to confirm or reject that the electronic survey system 118 has accurately detected that a face appears within a digital image. For example, some embodiments of the electronic survey system 118 associate question components with the headshot indicator 446 that enable the survey administrator 102 (or the survey respondent 108 during an administration of an electronic survey) to check or un-check the check-mark box of the headshot indicator 446. In some embodiments, the electronic survey system 118 applies machine-learning techniques to improve its recognition of faces with digital images based on the selections of the survey administrator 102 (or survey respondent 108) of the check-mark box of the headshot indicator 446.

As also shown in FIG. 4D, the identity determination indicator 454 indicates an identity of a person (within a question format) determined by the electronic survey system 118. The identity determination indicator 454 includes the question, "Is this Jane Smith? Yes No." In this particular embodiment, the electronic survey system 118 has determined the identity of a person corresponding to the face within the captured digital image 448 by comparing the facial features of the face within the captured digital image 448 with facial features of faces within previously captured digital images, including a previously captured image of the survey administrator 102. By interacting with the identity determination indicator 454, the survey administrator 102 (or survey respondent 108 during an administration of an electronic survey) may confirm that the captured digital image 448 shows the face of "Jane Smith" by selecting "Yes" or reject that the captured digital image 448 shows the face of "Jane Smith" by selecting "No." When the survey administrator 102 selects "Yes" or "No," the electronic survey system 118 updates the graphical user interface 400 to include a checkmark within the check-mark boxes next to "Yes" or "No.".

Additionally, in some embodiments, the electronic survey system 118 compares facial features of faces within digital images by comparing a relative measured distance between the facial features detected in the captured digital image 448 with a relative measured distance between facial features detected in previously captured digital images. For example, as shown in FIG. 4D, the electronic survey system 118 compares the relative measured distance between the point on the forehead and the glabella, between the point on the forehead and the left nostril, and between the point on the forehead and the right nostril. These facial features are merely exemplary. The electronic survey system 118 may compare the relative measured distance between or among any set of facial features within a captured digital image. In some embodiments, the electronic survey system 118 applies machine-learning techniques to improve its recognition of faces with digital images, such as the captured digital image 448, based on the selection of the survey administrator 102 (or the survey respondent 108 during an administration of an electronic survey) of the check-mark boxes within the identity determination indicator 454.

As mentioned above, some embodiments of the electronic survey system 118 provide a preview of an electronic survey question by itself, including authenticating questions. For example, in some embodiments, the electronic survey system 118 provides a preview of Q1 with an interactive signature field. In particular, the electronic survey system 118 associates question components with Q1 that instruct the interactive signature field to operate in the same way as interactive signature fields 440a and 440b, except that the electronic survey system 118 provides the interactive signature field within an interactive preview question window, without other electronic survey questions. The electronic survey system 118 may likewise provide a preview of an individual fingerprint capture or voiceprint capture question.

Figure 5:
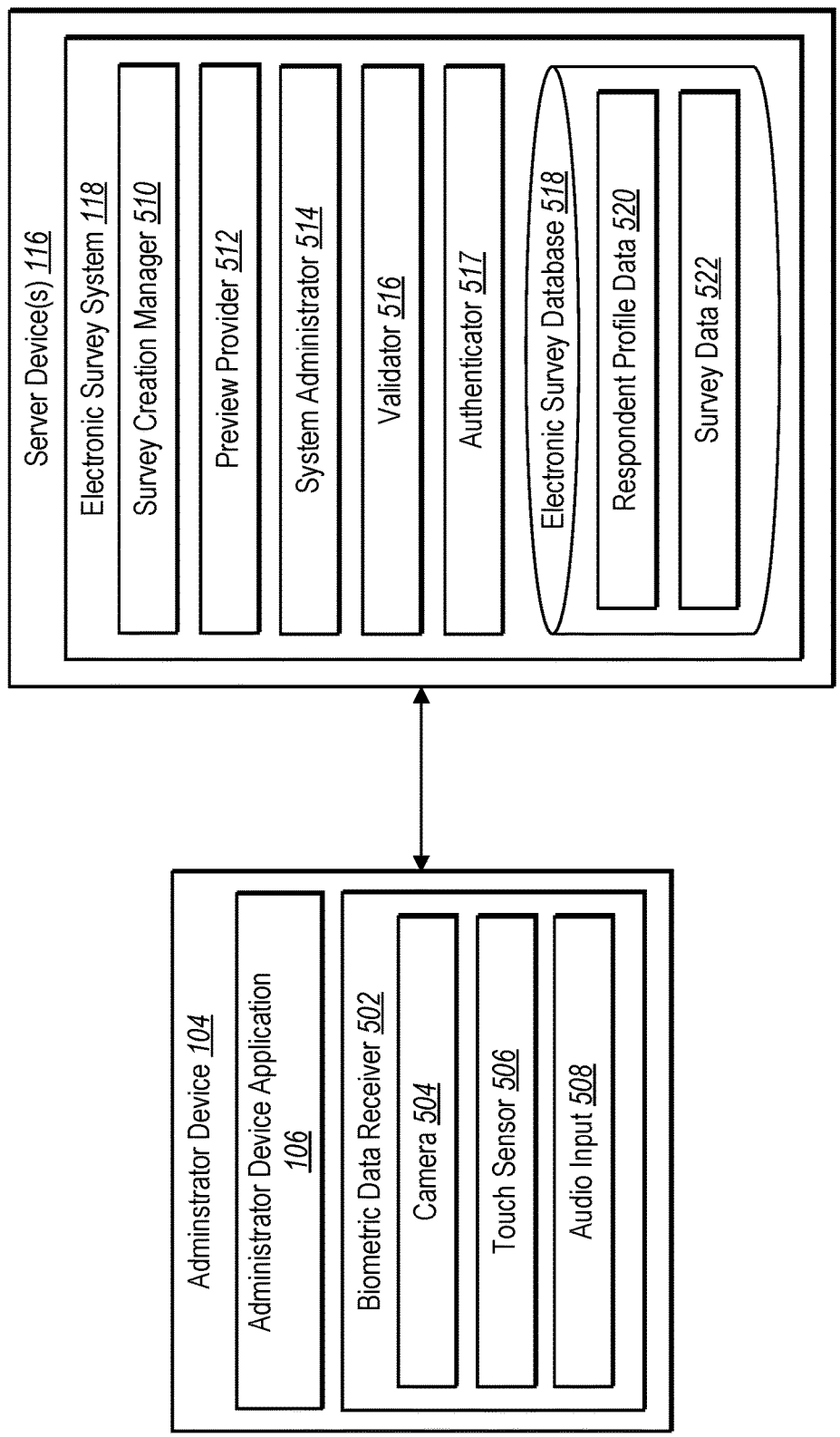
FIG. 5 illustrates a schematic diagram of server device(s) and an administrator device used in the communication system in accordance with one or more embodiments.

As also noted above, the communication system 100 includes the administrator device 104 and the server device(s) 116, each of which may include various hardware or software. FIG. 5 illustrates an embodiment of the administrator device 104 and an embodiment of the server device(s) 116. As shown, the administrator device 104 includes, but is not limited to, the administrator device application 106 and a biometric data receiver 502. The biometric data receiver 502 in turn includes a camera 504, a touch sensor 506, and an audio input element 508. The survey administrator 102 may use the administrator device 104 and its components to create and preview electronic survey questions.

As shown in FIG. 5, the administrator device application 106 provides the survey administrator 102 with an application through which the survey administrator 102 may interact with other components of the communication system 100. In some embodiments, the administrator device application 106 includes a web browser, an applet, or other software application that receives data from the server device(s) 116 over the network 114 and detects interactions between the survey administrator 102 and the administrator device 104. For example, in some embodiments, the administrator device application 106 detects the selections of the survey administrator 102 (from interactions with a display screen) that correspond to some or all of the options, controls, actions, and indicators described above with reference to FIGS. 2A-4D. In the alternative, the administrator device application 106 may include a software application that performs some or all of the functions of the electronic survey system 118 described above with reference to FIGS. 2A-4D.

Additionally, in some embodiments, the administrator device application 106 provides the graphical user interfaces 204, 300, and 400. Accordingly, some embodiments of the administrator device application 106 present the graphical user interfaces 204, 300, and 400 in embodiments that include some or all of the components illustrated in FIGS. 2A-4D. For example, the administrator device application 106 displays electronic survey templates 206, 302, and 402 within graphical user interface 204, 300, and 400, respectively.

As also shown in FIG. 5, the biometric data receiver 502 receives biometric inputs that the administrator device 104 communicates to the server device(s) 116 for receipt and analysis by the electronic survey system 118. For example, the camera 504 depicted in FIG. 5 captures digital images. In some embodiments, the camera 504 captures digital images in response to a selection by the survey administrator 102 of interactive image collection element 442a or 442b. Moreover, the survey administrator 102 may use the camera 504 to capture a digital image to respond to electronic survey questions requesting an image, such as Q3. Additionally, in some embodiments, the electronic survey system 118 applies some or all of the facial recognition techniques to the digital images captured by the camera 504 (whether the camera is part of the administrator device 104 or the respondent device 110).

As another example of the functionality of the biometric data receiver 502, the touch sensor 506 captures data representing a fingerprint. In some embodiments, the touch sensor 506 comprises (or is embedded within) a home button of the administrator device 104. In an additional or alternative embodiment, the touch sensor 506 captures data representing a fingerprint in response to a selection by the survey administrator 102 of a fingerprint capture prompt. The survey administrator 102 may interact with the touch sensor 506 to respond to a fingerprint capture prompt when, for example, the survey administrator 102 previews an electronic survey question—similar to the preview of Q3 illustrated in FIGS. 4C-4D.

Additionally, in some embodiments, the touch sensor 506 captures strokes or other touch gestures representing a digitally drawn signature. For example, the survey administrator 102 may interact with the touch sensor 506 to draw her signature to respond to a signature question when, for example, the survey administrator 102 previews an electronic survey question—similar to the preview of Q1 illustrated in FIG. 4B.

As yet another example of the functionality of the biometric data receiver 502, the audio input element 508 captures data representing a voiceprint. In some embodiments, the audio input element 508 is a microphone of the administrator device 104. In an additional or alternative embodiment, the audio input element 508 captures data representing a voiceprint in response to a selection by the survey administrator 102 of a voiceprint capture prompt. The survey administrator 102 may speak into the audio input element 508 to respond to a voiceprint capture prompt when, for example, the survey administrator previews an electronic survey question—similar to the preview of Q3 illustrated in FIGS. 4C-4D—except with an audio input element, a voiceprint capture prompt, and other components of a voiceprint capture question. Although FIG. 5 illustrates the biometric data receiver 502 within the administrator device 104, the respondent device 110 may likewise include a biometric data receiver that contains the same components and performs the same functions as the biometric data receiver 502 during an administration of an electronic survey.

Each of the components 106 and 502-508 of the administrator device 104 may communicate with one another using any suitable communication technologies. In addition, components 106 and 502-508 may be combined into fewer components, such as into a single component, or divided into more components as may serve a particular embodiment. In addition, components 106 and 502-508 may be located on, or implemented by, one or more computing devices, such as one or more administrator devices and/or one or more server devices (e.g., server device(s) 116).

As also illustrated in FIG. 5, the server device(s) 116 include the electronic survey system 118. In some embodiments of the communication system 100, the electronic survey system 118 includes, but is not limited to, a survey creation manager 510, a preview provider 512, a system administrator 514, a validator 516, an authenticator 517, and the electronic survey database 518. The server device(s) 116 store respondent profile data 520 and survey data 522 within the electronic survey database 518. The following paragraphs will describe certain embodiments of components within the electronic survey system 118.

In some embodiments, the electronic survey system 118 includes the survey creation manager 510. The survey creation manager 510 provides and operates the electronic survey templates; menus; and controls, options, and other actions included within the menus of the electronic survey system 118—such as electronic survey templates 206, 302, and 402 and the controls, options, and other actions included in question type menu 214, signature menu 240, and image menu 412. For example, in some embodiments of the electronic survey system 118, the survey creation manager 510 receives indications of selections from the administrator device 104 corresponding to certain formatting controls or skip logic or add logic options, such as formatting controls 248, display logic option 262, and skip logic option 264. In some embodiments, the survey creation manager 510 instructs the server device(s) 116 to perform functions corresponding to the selected formatting controls and skip logic or add logic options. Additionally, the survey creation manager 510 provides the data and instructions for the graphical user interfaces 204, 300, and 400.

As shown in FIG. 5, some embodiments of the electronic survey system 118 further include the preview provider 512. The preview provider 512 provides some or all of the data for—and instructs the server device(s) 116 to perform the functions corresponding to—the previews of electronic surveys and electronic survey questions, as described above with reference to FIGS. 4A-4D. For example, in combination with other components, such as the validator 516 or the authenticator 517, the preview provider 512 provides some of the data, options, and other features of the preview of the interactive electronic surveys 432a and 432b in FIG. 4B and the interactive preview question window in FIGS. 4C-4D. The preview provider 512 communicates with and displays data from the validator 516 when, for example, the preview provider 512 provides data or instructions for a validation option as part of a preview. In some embodiments, the preview provider 512 receives instructions from the validator 516 when the survey administrator 102 tests the features of electronic survey questions that involve a force response or prohibit upload option. In some embodiments, the preview provider 512 receives instructions from the authenticator 516 when the survey administrator 102 tests the features of electronic survey questions that involve a digitally drawn signature, a digital image, a fingerprint, or a voiceprint.

As also shown in FIG. 5, some embodiments of the electronic survey system 118 further include the system administrator 514. The system administrator 514 instructs to the server device(s) 116 to transmit and administer interactive electronic surveys to the respondent device 110 during an administration of an electronic survey. For example, in some embodiments, the system administrator 514 instructs the server device(s) 116 to transmit an interactive electronic survey to the respondent device 110 and receives indications of selections from the respondent device 110 in response to electronic survey questions. In some embodiments, the system administrator 514 sends a notice to the administrator device 104 comprising the results or responses of the survey respondent 108 to an interactive electronic survey.

Some embodiments of the electronic survey system 118 further include the validator 516. The validator 516 provides data and instructs the server device(s) 116 to perform actions corresponding to the validation options for validating responses to electronic survey questions, as described above with reference to FIGS. 2B-2C and FIG. 4A. For example, in some embodiments, the validator 516 provides data and instructs the server device(s) 116 to force a survey respondent to respond to a signature question, an image capture question, a fingerprint capture question, or a voiceprint capture question during an administration of an electronic survey.

Some embodiments of the electronic survey system 118 further include the authenticator 517. The authenticator 517 provides data and instructs the server device(s) 116 to perform actions corresponding to the authentication options for responses to authenticating questions, as described above with reference to FIGS. 2A-2C and FIG. 4A, including signature questions, image capture questions, fingerprint capture questions, and voiceprint capture questions. In some embodiments, the authenticator 517 instructs the server device(s) 116 to perform actions corresponding to the authentication options for the responses of the survey administrator 102 to interactive electronic survey questions within a preview.

For example, in some embodiments of the electronic survey system 118, the authenticator 517 associates with a person or profile (e.g., the survey administrator 102, the survey respondent 108) one or more saved digital files representing a digitally drawn signature, an image, a fingerprint, or a voiceprint—after the survey administrator 102 or survey respondent 108 has responded to an interactive electronic survey question by providing such an item. The authenticator 517 performs this association when, for example, the survey administrator 102 has selected the associate signature option 254, the associate image option 426, the associate fingerprint option, or the associate voiceprint option, respectively.

As noted above, certain embodiments of the electronic survey system 118 provide an option to validate digitally drawn signatures, digital images, fingerprints, or voiceprints. In some embodiments, the authenticator 517 provides data and instructions to perform that authentication. For example, when the survey administrator 102 selects the validate signature option 254, the authenticator compares a digitally drawn signature by the survey administrator 102 (or the survey respondent 108) with one or more previously digitally drawn signatures associated with the survey administrator 102 (or survey respondent 108)—after the survey administrator 102 (or survey respondent 108) responds to an interactive electronic survey question by digitally drawing a signature or uploading a digitally drawn signature. In some embodiments, the authenticator 517 determines whether the digitally drawn signature by the survey administrator 102 (or survey respondent 108) matches—to a predetermined confidence level—one or more previously stored digitally drawn signatures associated with the survey administrator 102 (or the survey respondent 108). In some embodiments, the authenticator 517 provides data and instructions to authenticate a digital image, data representing fingerprints, or data representing voiceprints provided by the survey administrator 102 (or by the survey respondent 108) in response to an image capture question, a fingerprint capture question, or a voiceprint capture question, respectively.

As mentioned above, certain embodiments of the electronic survey system 118 include the electronic survey database 518 of FIG. 5. The server device(s) 116 store data used by the electronic survey system 118 within the electronic survey database 518. For example, the server device(s) 116 store respondent profile data 520 within the electronic survey database 518. The respondent profile data 520 comprises data associated with a profile of the survey respondent 108 or any other survey respondent. The respondent profile data 520 includes, but is not limited to, data representing an identity, such as a name, address, location, or profile number; digital files containing a digitally drawn signature, a digital image, data representing a fingerprint, data representing a voiceprint; or digital files containing prior responses to interactive electronic survey questions—all of which are associated with the survey respondent 108 or another survey respondent. In an alternative embodiment, the administrator device 104 stores some or all of the respondent profile data 520.

The server device(s) 116 also store survey data 522 within the electronic survey database 518. The survey data 522 comprises data associated with one or more electronic surveys or electronic survey questions. The survey data 522 includes, but is not limited to, a library of electronic survey questions; validation rules; add logic rules; skip logic rules; algorithms for facial recognition techniques, machine-learning techniques, signature comparison techniques, image comparison techniques, fingerprint comparison techniques, or voiceprint comparison techniques; or data and digital files corresponding to electronic survey templates and the options, controls, indicators, actions, and menus associated with an electronic survey template.

Each of the components 118 and 510-522 of the server device(s) 116 may communicate with one another using any suitable communication technologies. In addition, components 118 and 510-522 may be combined into fewer components, such as into a single component, or divided into more components as may serve a particular embodiment. Each of components 106, 118, and 502-522 can also comprise software, hardware, or both. For example, each of components 106, 118, and 502-522 can comprise one or more instructions stored on a non-transitory computer-readable storage medium executed by one or more processors of one or more computing devices, such as the server device(s) 116. When executed by the one or more processors, the instructions cause a computing device to perform the methods described herein. Alternatively, components 106, 118, and 502-522 can comprise hardware, such as a special purpose processing device to perform a certain function or group of functions.

Figure 6:
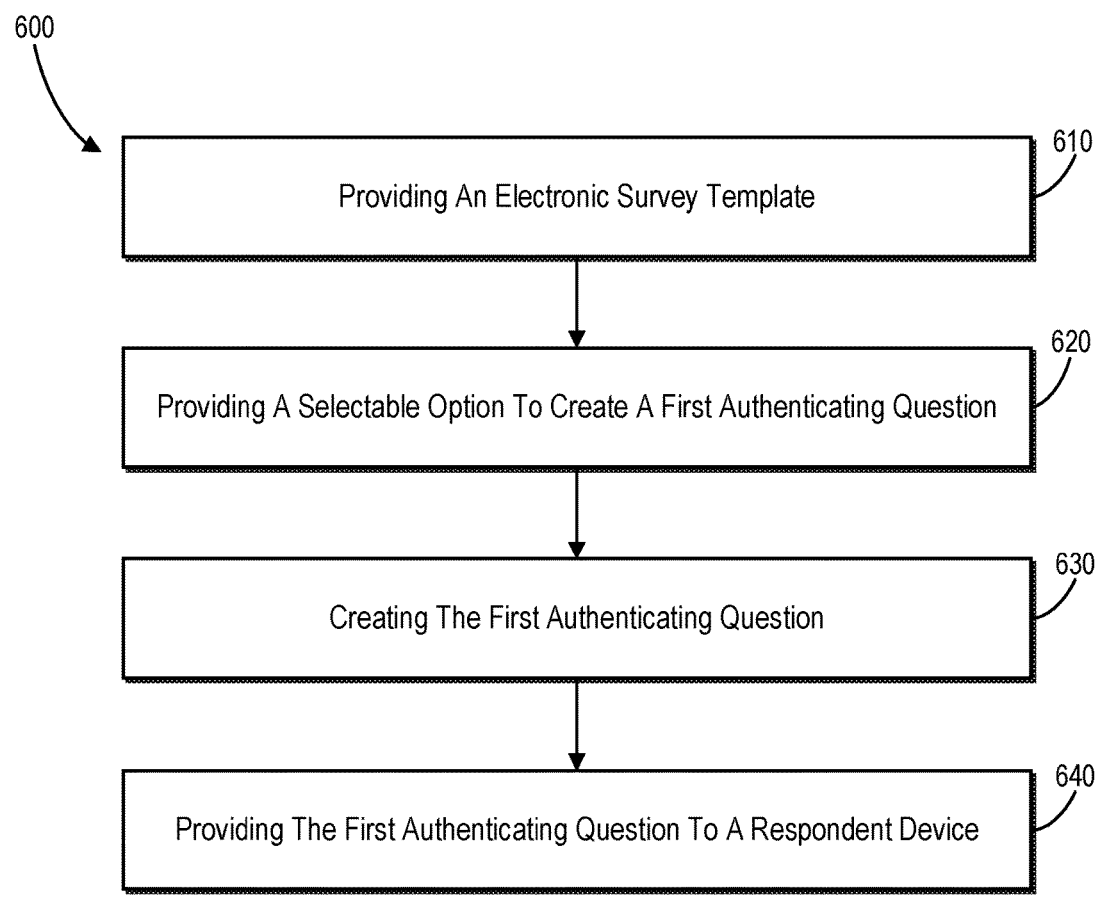
FIG. 6 illustrates a flowchart of a series of acts in a method for providing an electronic survey template in accordance with one or more embodiments.

FIG. 6 illustrates a flowchart of a series of acts in a method 600 of providing an electronic survey template in accordance with one or more embodiments of the electronic survey system 118. While FIG. 6 illustrates exemplary steps according to one embodiment, alternative embodiments may omit, add to, reorder, and/or modify any of the steps shown in FIG. 6. Further, the administrator device 104, the electronic survey system 118, or a combination of both, may perform one or more steps of the method 600.

As shown in FIG. 6, the method 600 includes an act 610 of providing an electronic survey template. In particular, the act 610 can include providing, by one or more servers to an administrator device, an electronic survey template for creating a user customizable electronic survey comprising one or more electronic survey questions.

As illustrated in FIG. 6, the method 600 includes an act 620 of providing a selectable option to create a first authenticating question. In particular, the act 620 can include providing, by the one or more servers to the administrator device, a selectable signature option to create, within the electronic survey template, a first authenticating question that enables a survey respondent to input a digitally drawn signature as a response to the first authenticating question. For example, in one or more embodiments, the signature field recognizes digital strokes to form a digitally drawn signature that is stored, by the one or more servers, as a scalable vector graphic file. Additionally, in one or more embodiments, the method 600 also includes providing, by the one or more servers to the administrator device, a selectable associating option to create a logic rule that associates the scalable vector graphic file with an account of a survey respondent when the survey respondent inputs a digitally drawn signature into the signature field.

Additionally, in one or more embodiments, the selectable signature option comprises a drag-and-drop feature that permits a user to drag an icon representing the signature field and drop the icon into a portion of the first authenticating question to add the signature field within the first authenticating question. Moreover, in one or more embodiments, the method 600 further includes receiving text data that prompts the survey respondent to input a digitally drawn signature within the signature field; and based on receiving the text data, inserting the text data into the electronic survey template to include the text data with the signature field in the electronic survey question.

As also illustrated in FIG. 6, the method 600 includes an act 630 of creating the first authenticating question. In particular, the act 630 can include, based on receiving an indication of a selection from the administrator device corresponding to the selectable signature option, creating the first authenticating question comprising a signature field within which the survey respondent may input a digitally drawn signature.

As also illustrated in FIG. 6, the method 600 includes an act 640 of providing the first authenticating question to a respondent device. In particular, the act 640 can include, providing, by the one or more servers to a respondent device, the first authenticating question comprising the signature field as part of an electronic survey.

In one or more embodiments, the method 600 also includes providing one or more signature formatting controls for modifying a format of the signature field. Additionally, in one or more embodiments of method 600, the one or more signature formatting controls define a size of the signature field within the electronic survey question.

Similarly, in one or more embodiments, the method 600 also includes providing to the administrator device a menu of formatting controls, the menu comprising a size control that allows a user to adjust the size of the signature field and a location control that allows the user to adjust the location of the signature field. Additionally, in one or more embodiments, the method 600 also includes providing to the administrator device a menu of formatting controls, the menu comprising a selectable text option to input a text within the signature field.

Certain embodiments of method 600 further provide authentication and validation functions. In one or more embodiments, for example, the method 600 also includes providing, by the one or more servers to the administrator device, a selectable identity authentication option; based on receiving an indication of a selection of the selectable identity authentication option, applying a logic rule to the electronic survey question to authenticate survey respondent identification data received in response to the first authenticating question, wherein the logic rule causes the one or more servers to compare the survey respondent identification data received from a given survey respondent to stored identification data for the given survey respondent maintained within a respondent profile database. Relatedly, in one or more embodiments of method 600, the survey respondent identification data comprises a digitally drawn signature that is input through the signature field.

As another example of an option employing a logic rule, some embodiments of method 600 also provide display or skip logic options. For example, in one or more embodiments, the method 600 also includes providing, by the one or more servers, a question display logic option to create a question display logic rule, wherein the question display logic rule causes the one or more servers to identify a next electronic survey question from among a plurality of potential next electronic survey questions based on whether the survey respondent identification data received in response to the first authenticating question is authenticated.

Additionally, in one or more embodiments, the method 600 also includes providing, by the one or more servers, a question skip logic option to create a question skip logic rule, wherein the question skip logic rule causes the one or more servers to identify one or more next electronic survey questions to skip from among a plurality of potential next electronic survey questions based on whether the survey respondent identification data received in response to the first authenticating question is authenticated.

Relatedly, in one or more embodiments, the method 600 also includes providing, by the one or more servers to the administrator device, a selectable signature authentication option; based on receiving an indication of a selection of the selectable signature authentication option from the administrator device, applying, by the one or more servers, a logic rule to the first authenticating question to authenticate that the survey respondent has input a digitally drawn signature into the signature field.

Moreover, in one or more embodiments, the method 600 further includes providing, by the one or more servers to the administrator device, a selectable signature matching option to create a logic rule that, when a survey respondent inputs a digitally drawn signature into the signature field, causes the one or more servers to: determine that the digitally drawn signature matches, to a predetermined confidence level, a previously stored digitally drawn signature associated with the survey respondent; and in response to determining that the digitally drawn signature matches the previously stored digitally drawn signature, associate the digitally drawn signature with a response from a respondent device to the first authenticating question.

Method 600 further comprises certain embodiments that use a digital image, fingerprint, or voiceprint. For example, in one or more embodiments, the method 600 includes providing, by the one or more servers to the administrator device, a selectable image collection option to create, within the electronic survey template, a second authenticating question that enables a survey respondent to capture a digital image portraying the face of the survey respondent as a response to the second authenticating question; and based on receiving an indication of a selection from the administrator device corresponding to the selectable image collection option, creating the second authenticating question comprising an image collection element that enables the survey respondent to capture a digital image portraying the face of the survey respondent.

As another example, in one or more embodiments, the method 600 includes providing, by the one or more servers to the administrator device, a selectable fingerprint option to create, within the electronic survey template, a second authenticating question that directs the survey respondent to interact with a touch sensor on the respondent device, wherein the touch sensor captures data representing a fingerprint of the survey respondent and the respondent device transmits the data representing the fingerprint to the one or more servers for storage as a digital file; and based on receiving an indication of a selection from the administrator device corresponding to the selectable fingerprint option, creating the second authenticating question comprising a fingerprint capture prompt that directs the survey respondent to interact with a touch sensor on the respondent device to capture data representing a fingerprint of the survey respondent and directs the respondent device to transmit the data representing the fingerprint to the one or more servers.

As yet another example, in one or more embodiments, the method 600 includes providing, by the one or more servers to the administrator device, a selectable voiceprint option to create, within the electronic survey template, a second authenticating question that directs the survey respondent to speak into an audio input element on the respondent device, wherein the audio input element records the voice of the survey respondent and the respondent device transmits the recorded voice to the one or more servers for storage as a digital file; and based on receiving an indication of a selection from the administrator device corresponding to the selectable voiceprint option, creating the second authenticating question comprising a voiceprint capture prompt that directs the survey respondent to speak into an audio input element on the respondent device and directs the respondent device to transmit the recorded voice to the one or more servers.

Some embodiments of method 600 further provide preview options. For example, in one or more embodiments, the method 600 also includes providing, by the one or more servers to the administrator device, a selectable template preview option to preview a populated electronic survey template as an interactive electronic survey within the graphical user interface, the interactive electronic survey comprising the first authenticating question with an interactive signature field in which a user may input a digitally drawn signature, wherein the graphical user interface allows for: detecting an indication of a selection from the administrator device corresponding to the selectable template preview option to preview the populated electronic survey template within the graphical user interface as the interactive electronic survey; and populating a preview of the interactive electronic survey comprising the first authenticating question with the interactive signature field within the graphical user interface.

As another example, in one or more embodiments, the method 600 also includes providing, by the one or more servers to the administrator device, a selectable signature preview option to preview the first authenticating question with the signature field within the graphical user interface as an interactive authenticating question with the signature field in which a user may input a digitally drawn signature, wherein the graphical user interface allows for: detecting an indication of a selection from the administrator device corresponding to the selectable signature preview option to preview the interactive authenticating question within the graphical user interface; and populating a preview of the interactive authenticating question within the graphical user interface.

Figure 7:
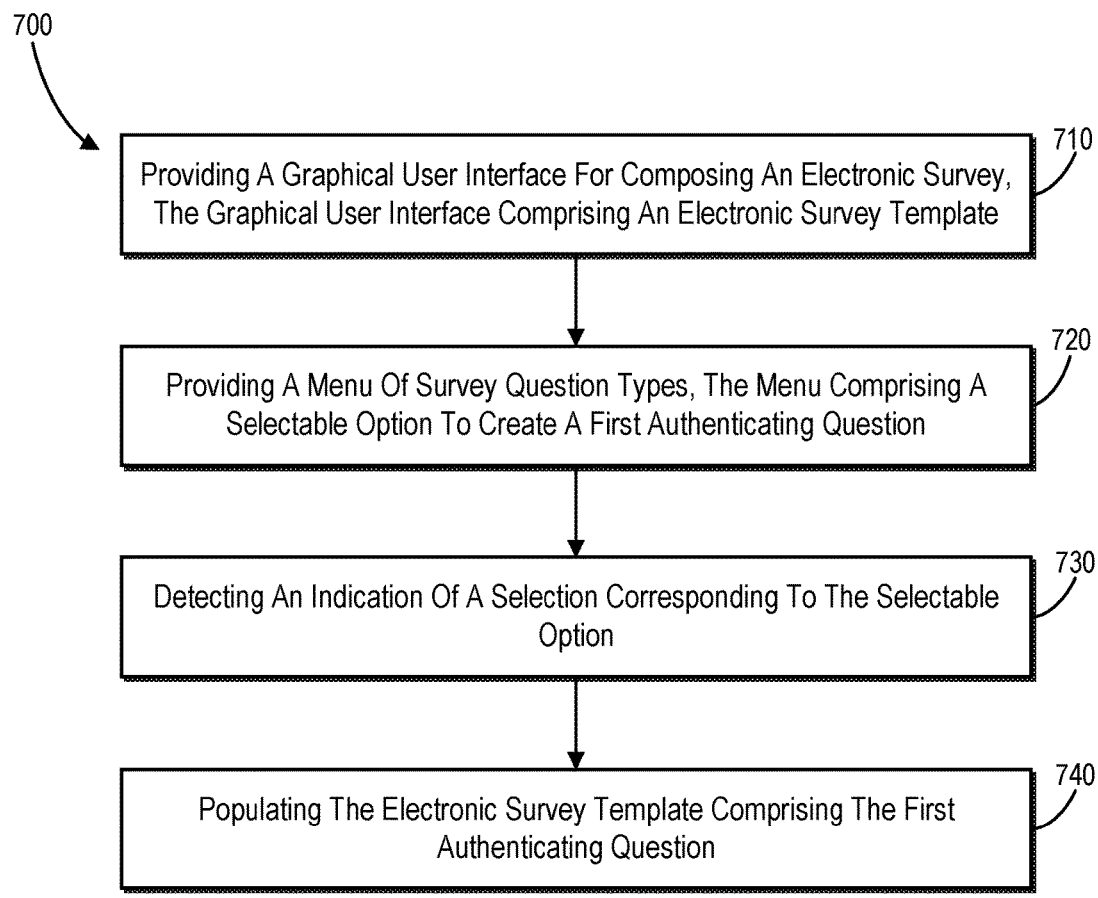
FIG. 7 illustrates a flowchart of a series of acts in a method for providing a graphical user interface for composing an electronic survey in accordance with one or more embodiments.

FIG. 7 illustrates a flowchart of a series of acts in a method 700 of providing a graphical user interface for composing an electronic survey in accordance with one or more embodiments of the electronic survey system 118. While FIG. 7 illustrates steps according to one embodiment, alternative embodiments may omit, add to, reorder, and/or modify any of the steps shown in FIG. 7. Further, the administrator device 104, the electronic survey system 118, or a combination of both, may perform one or more steps of the method 700.

As shown in FIG. 7, the method 700 includes an act 710 of providing a graphical user interface for composing an electronic survey, the graphical user interface comprising an electronic survey template. In particular, the act 710 can include providing, by one or more servers to an administrator device, a graphical user interface for composing an electronic survey, the graphical user interface comprising an electronic survey template to create a user customizable electronic survey comprising one or more electronic survey questions.

As illustrated in FIG. 7, the method 700 includes an act 720 of providing a menu of survey question types, the menu comprising a selectable option to create a first authenticating question. In particular, the act 720 can include providing, by the one or more servers to the administrator device, a menu of survey question types within the graphical user interface, the menu comprising a selectable signature option to create, within the electronic survey template, a first authenticating question that enables a survey respondent to input a digitally drawn signature as a response to the first authenticating question. For example, in one or more embodiments, the signature field recognizes digital strokes to form a digitally drawn signature that is stored, by the one or more servers, as a scalable vector graphic file. Additionally, in one or more embodiments, the method 700 also includes providing, by the one or more servers to the administrator device, a selectable associating option to create a logic rule that associates the scalable vector graphic file with an account of the survey respondent when the survey respondent inputs a digitally drawn signature into the signature field.

Additionally, in one or more embodiments, the selectable signature option comprises a drag-and-drop feature that permits a user to drag an icon representing the signature field and drop the icon into a portion of the first authenticating question to add the signature field within the first authenticating question. Moreover, in one or more embodiments, the method 700 further includes receiving text data that prompts the survey respondent to input a digitally drawn signature within the signature field; and based on receiving the text data, inserting the text data into the electronic survey template to include the text data with the signature field in the electronic survey question.

As also illustrated in FIG. 7, the method 700 includes an act 730 of detecting an indication of a selection corresponding to the selectable option. In particular, the act 730 can include wherein the graphical user interface allows for: detecting an indication of a selection from the administrator device corresponding to the selectable signature option within the graphical user interface.

As further illustrated in FIG. 7, the method 700 includes an act 740 of populating the electronic survey template comprising the first authenticating question. In particular, the act 740 can include wherein the graphical user interface allows for: populating the electronic survey template comprising the first authenticating question with the signature field within the graphical user interface.

In one or more embodiments, the method 700 also includes providing one or more signature formatting controls for modifying a format of the signature field. Additionally, in one or more embodiments of method 700, the one or more signature formatting controls define a size of the signature field within the electronic survey question.

Similarly, in one or more embodiments, the method 700 also includes providing to the administrator device a menu of formatting controls, the menu comprising a size control that allows a user to adjust the size of the signature field and a location control that allows the user to adjust the location of the signature field. Additionally, in one or more embodiments, the method 700 also includes providing to the administrator device a menu of formatting controls, the menu comprising a selectable text option to input a text within the signature field.

Certain embodiments of method 700 further provide authentication and validation functions. In one or more embodiments, for example, the method 700 also includes providing, by the one or more servers to the administrator device, a selectable identity authentication option; based on receiving an indication of a selection of the selectable identity authentication option, applying a logic rule to the electronic survey question to authenticate survey respondent identification data received in response to the first authenticating question, wherein the logic rule causes the one or more servers to compare the survey respondent identification data received from a given survey respondent to stored identification data for the given survey respondent maintained within a respondent profile database. Relatedly, in one or more embodiments of method 700, the survey respondent identification data comprises a digitally drawn signature that is input through the signature field.

As another example of an option employing a logic rule, some embodiments of method 700 also provide display or skip logic options. For example, in one or more embodiments, the method 700 also includes providing, by the one or more servers, a question display logic option to create a question display logic rule, wherein the question display logic rule causes the one or more servers to identify a next electronic survey question from among a plurality of potential next electronic survey questions based on whether the survey respondent identification data received in response to the first authenticating question is authenticated.

Additionally, in one or more embodiments, the method 700 also includes providing, by the one or more servers, a question skip logic option to create a question skip logic rule, wherein the question skip logic rule causes the one or more servers to identify one or more next electronic survey questions to skip from among a plurality of potential next electronic survey questions based on whether the survey respondent identification data received in response to the first authenticating question is authenticated.

Relatedly, in one or more embodiments, the method 700 also includes providing, by the one or more servers to the administrator device, a selectable signature authentication option; based on receiving an indication of a selection of the selectable signature authentication option from the administrator device, applying, by the one or more servers, a logic rule to the first authenticating question to authenticate that the survey respondent has input a digitally drawn signature into the signature field.

Moreover, in one or more embodiments, the method 700 further includes providing, by the one or more servers to the administrator device, a selectable signature matching option to create a logic rule that, when a survey respondent inputs a digitally drawn signature into the signature field, causes the one or more servers to: determine that the digitally drawn signature matches, to a predetermined confidence level, a previously stored digitally drawn signature associated with the survey respondent; and in response to determining that the digitally drawn signature matches the previously stored digitally drawn signature, associate the digitally drawn signature with a response from a respondent device to the first authenticating question.

Method 700 further comprises certain embodiments that use a digital image, fingerprint, or voiceprint. For example, in one or more embodiments, the method 700 includes providing, by the one or more servers to the administrator device, a selectable image collection option to create, within the electronic survey template, a second authenticating question that enables a survey respondent to capture a digital image portraying the face of the survey respondent as a response to the second authenticating question; and based on receiving an indication of a selection from the administrator device corresponding to the selectable image collection option, creating the second authenticating question comprising an image collection element that enables the survey respondent to capture a digital image portraying the face of the survey respondent.

As another example, in one or more embodiments, the method 700 includes providing, by the one or more servers to the administrator device, a selectable fingerprint option to create, within the electronic survey template, a second authenticating question that directs the survey respondent to interact with a touch sensor on the respondent device, wherein the touch sensor captures data representing a fingerprint of the survey respondent and the respondent device transmits the data representing the fingerprint to the one or more servers for storage as a digital file; and based on receiving an indication of a selection from the administrator device corresponding to the selectable fingerprint option, creating the second authenticating question comprising a fingerprint capture prompt that directs the survey respondent to interact with a touch sensor on the respondent device to capture data representing a fingerprint of the survey respondent and directs the respondent device to transmit the data representing the fingerprint to the one or more servers.

As yet another example, in one or more embodiments, the method 700 includes providing, by the one or more servers to the administrator device, a selectable voiceprint option to create, within the electronic survey template, a second authenticating question that directs the survey respondent to speak into an audio input element on the respondent device, wherein the audio input element records the voice of the survey respondent and the respondent device transmits the recorded voice to the one or more servers for storage as a digital file; and based on receiving an indication of a selection from the administrator device corresponding to the selectable voiceprint option, creating the second authenticating question comprising a voiceprint capture prompt that directs the survey respondent to speak into an audio input element on the respondent device and directs the respondent device to transmit the recorded voice to the one or more servers.

Some embodiments of method 700 further provide preview options. For example, in one or more embodiments, the method 700 also includes providing, by the one or more servers to the administrator device, a selectable template preview option to preview the populated electronic survey template as an interactive electronic survey within the graphical user interface, the interactive electronic survey comprising the first authenticating question with an interactive signature field in which a user may input a digitally drawn signature, wherein the graphical user interface allows for: detecting an indication of a selection from the administrator device corresponding to the selectable template preview option to preview the populated electronic survey template within the graphical user interface as the interactive electronic survey; and populating a preview of the interactive electronic survey comprising the first authenticating question with the interactive signature field within the graphical user interface.

As another example, in one or more embodiments, the method 700 also includes providing, by the one or more servers to the administrator device, a selectable signature preview option to preview the first authenticating question with the signature field within the graphical user interface as an interactive authenticating question with the signature field in which a user may input a digitally drawn signature, wherein the graphical user interface allows for: detecting an indication of a selection from the administrator device corresponding to the selectable signature preview option to preview the interactive authenticating question within the graphical user interface; and populating a preview of the interactive authenticating question within the graphical user interface.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), flash memory, phase-change memory ("PCM"), other types of memory, other optical disk storage, magnetic disk storage or other magnetic storage devices, or any other medium that can be used to store desired program code means in the form of computer-executable instructions or data structures and that can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links that can be used to carry desired program code means in the form of computer-executable instructions or data structures and that can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
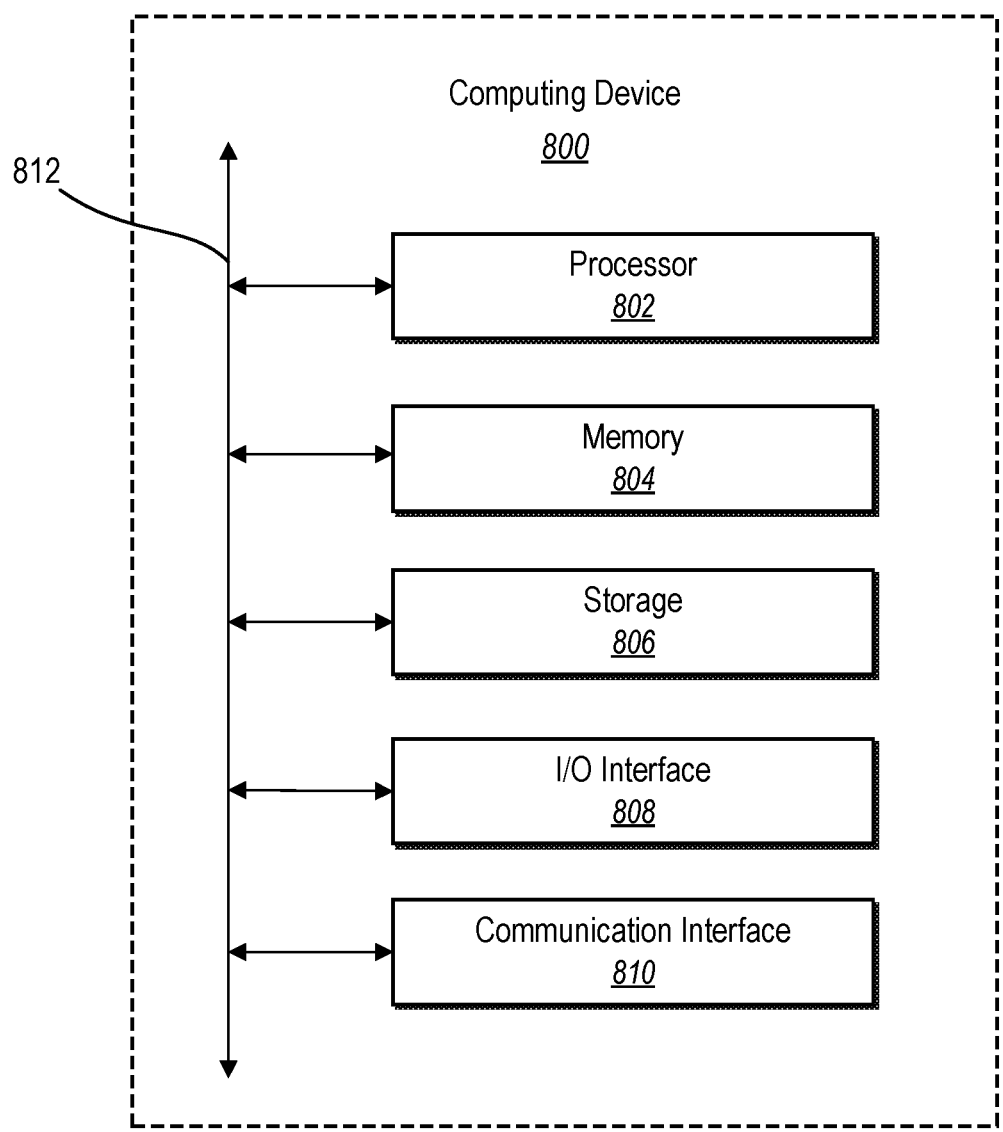
FIG. 8 illustrates a block diagram of a computing device in accordance with one or more embodiments.

FIG. 8 illustrates a block diagram of an exemplary computing device 800 that may be configured to perform one or more of the processes described above. One will appreciate that one or more computing devices such as the computing device 800 may implement the server device(s) 116 and/or other devices described above in connection with FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. While the exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage device 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from the computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
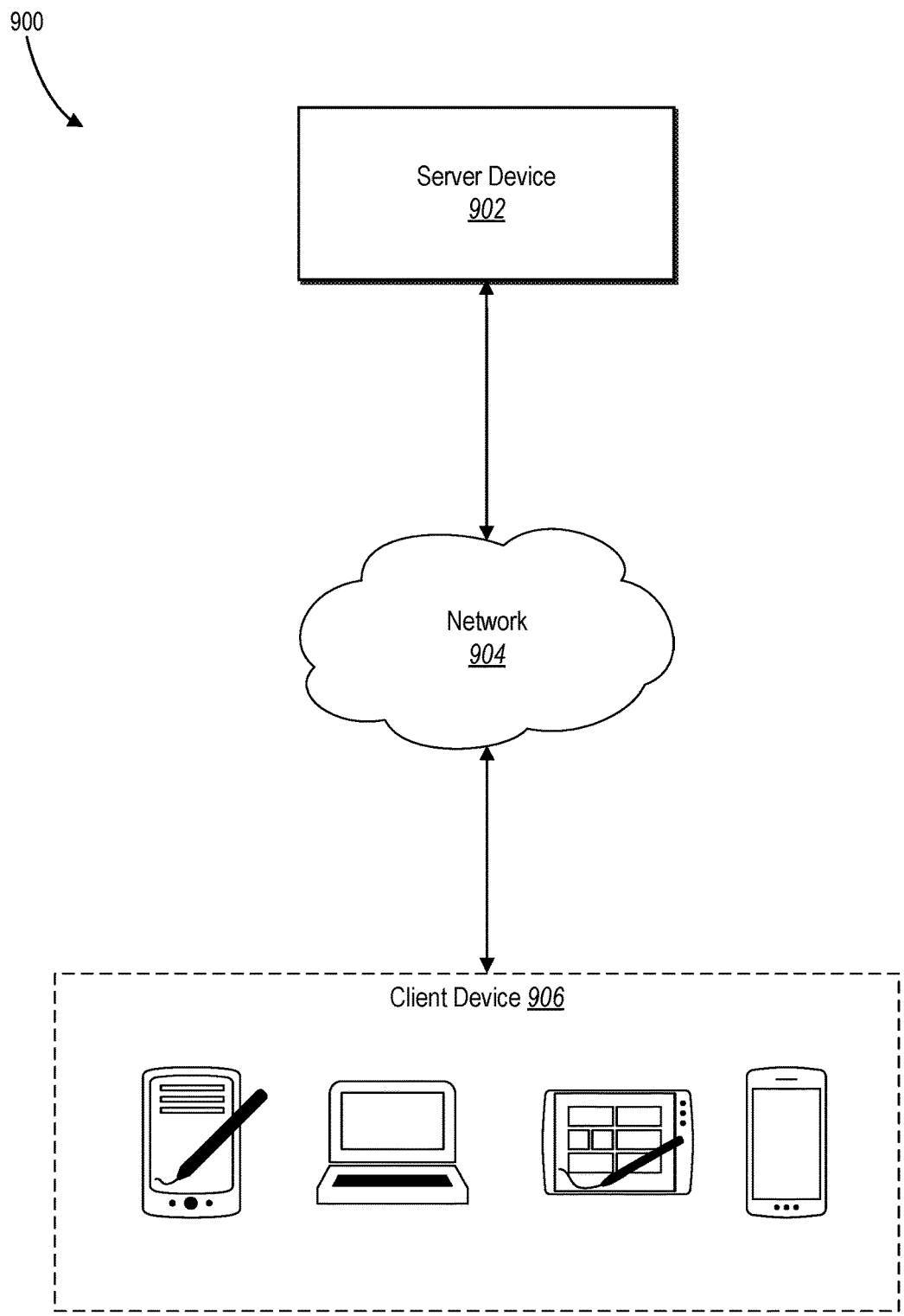
FIG. 9 illustrates a networking environment of an electronic survey composition system in accordance with one or more embodiments.

FIG. 9 illustrates an example network environment 900 of the communication system 100. Network environment 900 includes a client device 906, and a server device 902 connected to each other by a network 904. Although FIG. 9 illustrates a particular arrangement of client system 906, server device 902, and network 904, this disclosure contemplates any suitable arrangement of client device 906, server device 902, and network 904. As an example and not by way of limitation, two or more of client device 906, and server device 902 may be connected to each other directly, bypassing network 904. As another example, two or more of client device 906 and server device 902 may be physically or logically co-located with each other in whole, or in part. Moreover, although FIG. 9 illustrates a particular number of client devices 906, server devices 902, and networks 904, this disclosure contemplates any suitable number of client devices 906, server devices 902, and networks 904. As an example and not by way of limitation, network environment 900 may include multiple client devices 906, server devices 902, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client device 906, and server device 902 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example and not by way of limitation, a client device 906 may include any of the computing devices discussed above in relation to FIG. 8. A client device 906 may enable a network user at client device 906 to access network 904.

In particular embodiments, client device 906 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 906 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client device 906 one or more Hyper Text Markup Language (HTML) files responsive to the HTTP request. Client device 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 902 may include a variety of servers, sub-systems, programs, modules, logs, and data stores. In particular embodiments, server device 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 902 may also include suitable components such as network interfaces, security mechanisms, load balancers, failover servers, management-and-network-operations consoles, other suitable components, or any suitable combination thereof.

In particular embodiments, server device 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments. The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
providing, by one or more servers for display on a screen of an administrator device, an electronic survey template for creating a user customizable electronic survey comprising one or more electronic survey questions, the electronic survey template comprising a graphical space for creating the one or more electronic survey questions;
providing, by the one or more servers for display on the screen of the administrator device, a selectable signature option to create, within the electronic survey template, a first authenticating question that enables a survey respondent to digitally draw a signature as a response to the first authenticating question;
based on receiving an indication of a selection from the administrator device corresponding to the selectable signature option, creating, within the graphical space of the electronic survey template for display on the screen of the administrator device, the first authenticating question comprising a signature field for the survey respondent to digitally draw a signature; and
providing, by the one or more servers for display on the screen of the administrator device, a question display logic option to create a question display logic rule that causes the one or more servers to identify a next electronic survey question from among a plurality of potential next electronic survey questions based on whether survey respondent identification data received in response to the first authenticating question is authenticated.

2. The method of claim 1, further comprising:
providing, by the one or more servers for display on the screen of the administrator device, a selectable signature authentication option; and
based on receiving an indication of a selection of the selectable signature authentication option from the administrator device, apply, by the one or more servers, an authentication logic rule to the first authenticating question to authenticate that the survey respondent has digitally drawn a signature into the signature field.

3. The method of claim 1, further comprising providing one or more signature formatting controls for modifying a format of the signature field.

4. The method of claim 1, further comprising:
receiving text data that prompts the survey respondent to digitally draw a signature within the signature field; and
based on receiving the text data, inserting the text data into the electronic survey template to include the text data with the signature field in the first authenticating question.

5. The method of claim 1, further comprising:
providing, by the one or more servers to the administrator device, a selectable identity authentication option; and
based on receiving an indication of a selection of the selectable identity authentication option, applying an authentication logic rule to the first authenticating question to authenticate the survey respondent identification data received in response to the first authenticating question, wherein the authentication logic rule causes the one or more servers to compare the survey respondent identification data received from a given survey respondent to stored identification data for the given survey respondent maintained within a respondent profile database.

6. The method of claim 5, wherein the survey respondent identification data comprises a digitally drawn signature within the signature field.

7. The method of claim 5, further comprising:
based on receiving an indication of a selection of the question display logic option, providing, by the one or more servers for display on the screen of the administrator device, a conditional option from a plurality of conditional options comprising selectable components that define the question display logic rule causing the one or more servers to identify the next electronic survey question.

8. The method of claim 1, further comprising:
providing, by the one or more servers for display on the screen of the administrator device, a selectable image collection option to create, within the electronic survey template, a second authenticating question that enables the survey respondent to capture a digital image portraying a face of the survey respondent as a response to the second authenticating question; and
based on receiving an indication of a selection from the administrator device corresponding to the selectable image collection option, creating, within the graphical space of the electronic survey template for display on the screen of the administrator device, the second authenticating question comprising an image collection element that enables the survey respondent to capture a digital image portraying the face of the survey respondent.

9. A non-transitory computer readable storage medium comprising instructions that, when executed by at least one processor, cause a computing device to:
provide, for display on a screen of an administrator device, a graphical user interface for composing an electronic survey, the graphical user interface comprising an electronic survey template to create a user customizable electronic survey comprising one or more electronic survey questions;
provide, for display on the screen of the administrator device, a menu of survey question types within the graphical user interface, the menu comprising a selectable signature option to create, within the electronic survey template, a first authenticating question that enables a survey respondent to digitally draw a signature as a response to the first authenticating question, wherein the graphical user interface allows for:
detecting an indication of a selection from the administrator device corresponding to the selectable signature option within the graphical user interface; and
populating, within the graphical user interface, the electronic survey template comprising the first authenticating question with a signature field for the survey respondent to digitally draw a signature; and
provide, for display within the graphical user interface, a question display logic option to create a question display logic rule that identifies a next electronic survey question from among a plurality of potential next electronic survey questions based on whether survey respondent identification data received in response to the first authenticating question is authenticated.

10. The non-transitory computer readable storage medium of claim 9, further comprising instructions that, when executed by the at least one processor, cause the computing device to:
provide, for display on the screen of the administrator device, a selectable template preview option to preview the populated electronic survey template as an interactive electronic survey within the graphical user interface, the interactive electronic survey comprising the first authenticating question with an interactive signature field, wherein the graphical user interface allows for:
detecting an indication of a selection from the administrator device corresponding to the selectable template preview option to preview the populated electronic survey template within the graphical user interface as the interactive electronic survey; and
populating, within the graphical user interface, a preview of the interactive electronic survey comprising the first authenticating question with the interactive signature field.

11. The non-transitory computer readable storage medium of claim 9, further comprising instructions that, when executed by the at least one processor, cause the computing device to:
provide, for display on the screen of the administrator device, a selectable signature preview option to preview the first authenticating question within the graphical user interface as an interactive authenticating question with an interactive signature field, wherein the graphical user interface allows for:
detecting an indication of a selection from the administrator device corresponding to the selectable signature preview option to preview the interactive authenticating question within the graphical user interface; and
populating, within the graphical user interface, a preview of the interactive authenticating question with the interactive signature field.

12. The non-transitory computer readable storage medium of claim 9, wherein the signature field recognizes digital strokes to form a digitally drawn signature that is stored as a scalable vector graphic file.

13. The non-transitory computer readable storage medium of claim 12, further comprising instructions that, when executed by the at least one processor, cause the computing device to:

provide, for display on the screen of the administrator device, a selectable associating option to create a logic rule that associates the scalable vector graphic file with an account of the survey respondent when the survey respondent digitally draws a given signature into the signature field.

14. The non-transitory computer readable storage medium of claim 9, further comprising instructions that, when executed by the at least one processor, cause the computing device to:
provide, display on the screen of the administrator device, a selectable signature matching option to create a logic rule that, when the survey respondent digitally draws the signature within the signature field, causes the or more servers to:
determine that the digitally drawn signature matches, to a predetermined confidence level, a previously stored digitally drawn signature associated with the survey respondent; and
in response to determining that the digitally drawn signature matches the previously stored digitally drawn signature, associate the digitally drawn signature with a response from a respondent device to the first authenticating question.

15. A system comprising:
at least one processor; and
at least one non-transitory computer readable storage medium storing instructions that, when executed by the at least one processor, cause the system to:
provide, for display on a screen of an administrator device, an electronic survey template for creating a user customizable electronic survey comprising one or more electronic survey questions, the electronic survey template comprising a graphical space for creating the one or more electronic survey questions;
provide, for display on the screen of the administrator device, a selectable signature option to create, within the electronic survey template, a first authenticating question that enables a survey respondent to digitally draw a signature as a response to the first authenticating question;
based on receiving an indication of a selection from the administrator device corresponding to the selectable signature option, create, within the graphical space of the electronic survey template for display on the screen of the administrator device, the first authenticating question by adding into the first authenticating question a signature field for the survey respondent to digitally draw a signature; and
provide, for display on the screen of the administrator device, a question display logic option to create a question display logic rule that identifies a next electronic survey question from among a plurality of potential next electronic survey questions based on whether survey respondent identification data received in response to the first authenticating question is authenticated.

16. The system of claim 15, wherein the selectable signature option comprises a drag-and-drop feature that permits the administrator to drag an icon representing the signature field and drop the icon into a portion of the first authenticating question to add the signature field within the first authenticating question.

17. The system of claim 15, further comprising instructions that, when executed by the at least one processor, cause the system to:
provide for display on the screen of the administrator device a selectable signature authentication option; and
based on receiving an indication of a selection of the selectable signature authentication option from the administrator device, apply an authentication logic rule to the first authenticating question to authenticate that the survey respondent has digitally drawn a signature into the signature field.

18. The system of claim 15, further comprising instructions that, when executed by the at least one processor, cause the system to:
provide for display on the screen of the administrator device a menu of formatting controls, the menu comprising a size control that allows a user to adjust the size of the signature field and a location control that allows the user to adjust the location of the signature field.

19. The system of claim 15, further comprising instructions that, when executed by the at least one processor, cause the system to:
provide for display on the screen of the administrator device a selectable fingerprint option to create, within the electronic survey template, a second authenticating question that directs a given survey respondent to interact with a touch sensor on a given respondent device, wherein the touch sensor captures data representing a given fingerprint of the given survey respondent and the given respondent device transmits the data representing the given fingerprint to the system for storage as a digital file; and
based on receiving an indication of a selection from the administrator device corresponding to the selectable fingerprint option, create, within the graphical space of the electronic survey template for display on the screen of the administrator device, the second authenticating question comprising a fingerprint capture prompt that directs the given survey respondent to interact with the touch sensor on the given respondent device to capture data representing the given fingerprint of the given survey respondent and directs the given respondent device to transmit the data representing the given fingerprint to the system.

20. The system of claim 15, further comprising instructions that, when executed by the at least one processor, cause the system to:
provide for display on the screen of the administrator device a selectable voiceprint option to create, within the electronic survey template, a second authenticating question that directs a given survey respondent to speak into an audio input element on a given respondent device, wherein the audio input element records a voice of a given survey respondent and the given respondent device transmits the recorded voice to the system for storage as a digital file; and
based on receiving an indication of a selection from the administrator device corresponding to the selectable voiceprint option, create, within the graphical space of the electronic survey template for display on the screen of the administrator device, the second authenticating question comprising a voiceprint capture prompt that directs the given survey respondent to speak into the audio input element on the given respondent device and directs the given respondent device to transmit the recorded voice to the system.

* * * * *